March 3, 1953     A. E. JOEL, JR., ET AL     2,630,270
AUTOMATIC ACCOUNTING DEVICE
Filed June 24, 1949     18 Sheets-Sheet 1
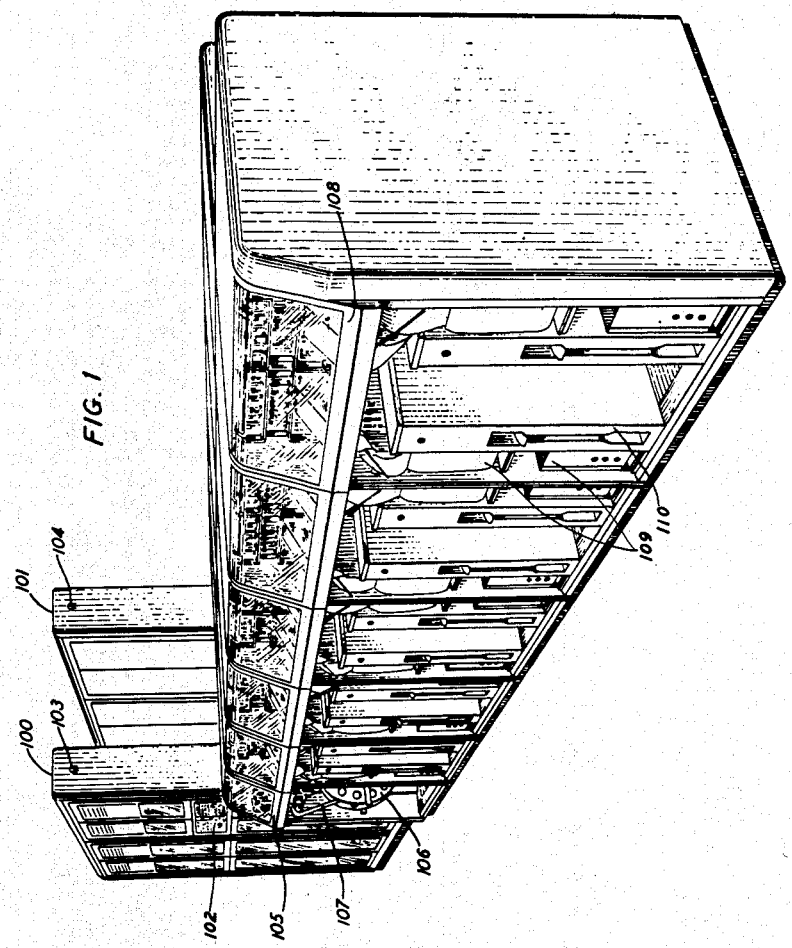
INVENTORS: A. E. JOEL, JR.
R. O. RIPPERE
BY John A. Hall
ATTORNEY

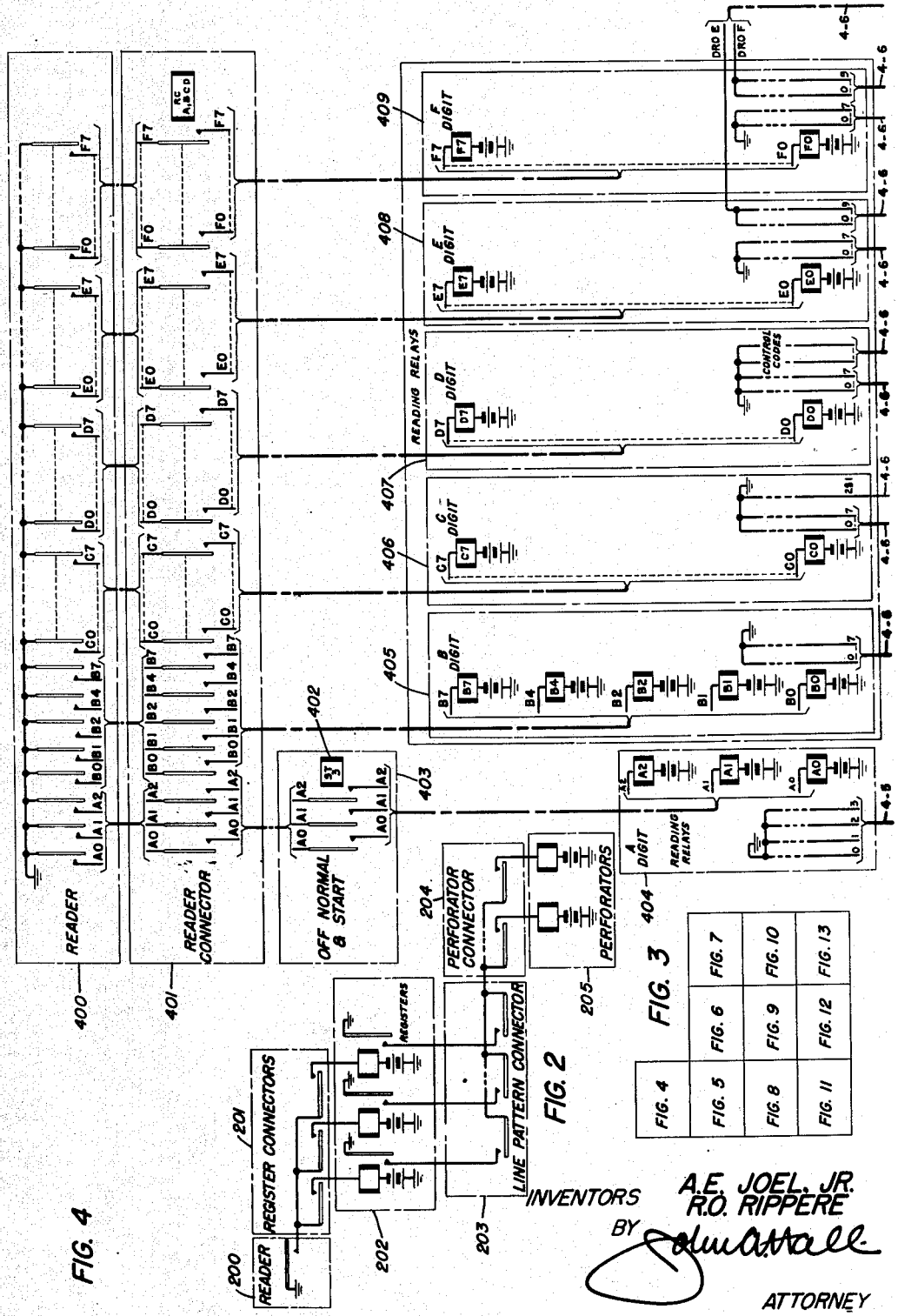

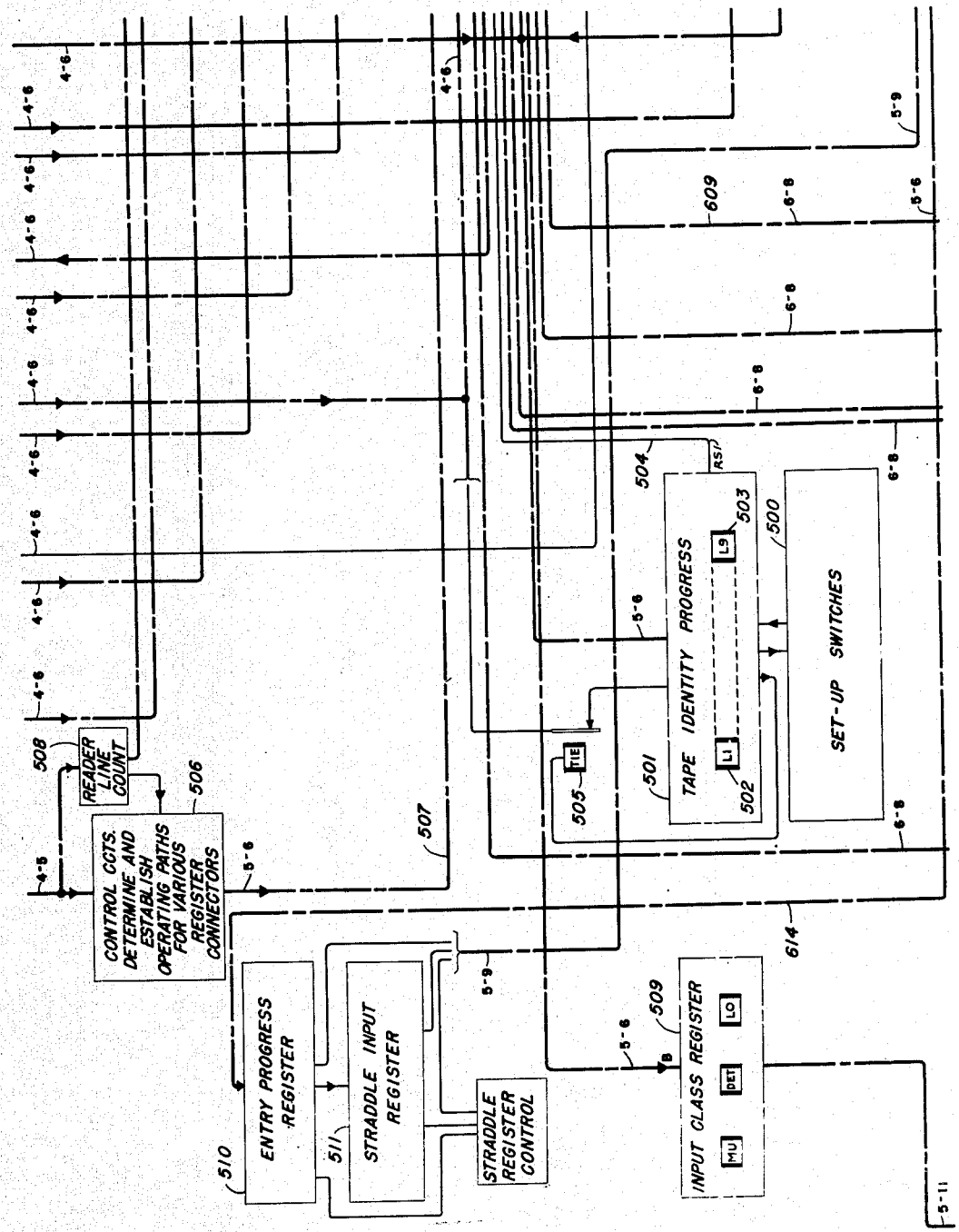

March 3, 1953　　　A. E. JOEL, JR., ET AL　　　2,630,270
AUTOMATIC ACCOUNTING DEVICE
Filed June 24, 1949　　　　　　　　　　　　　　　18 Sheets-Sheet 6
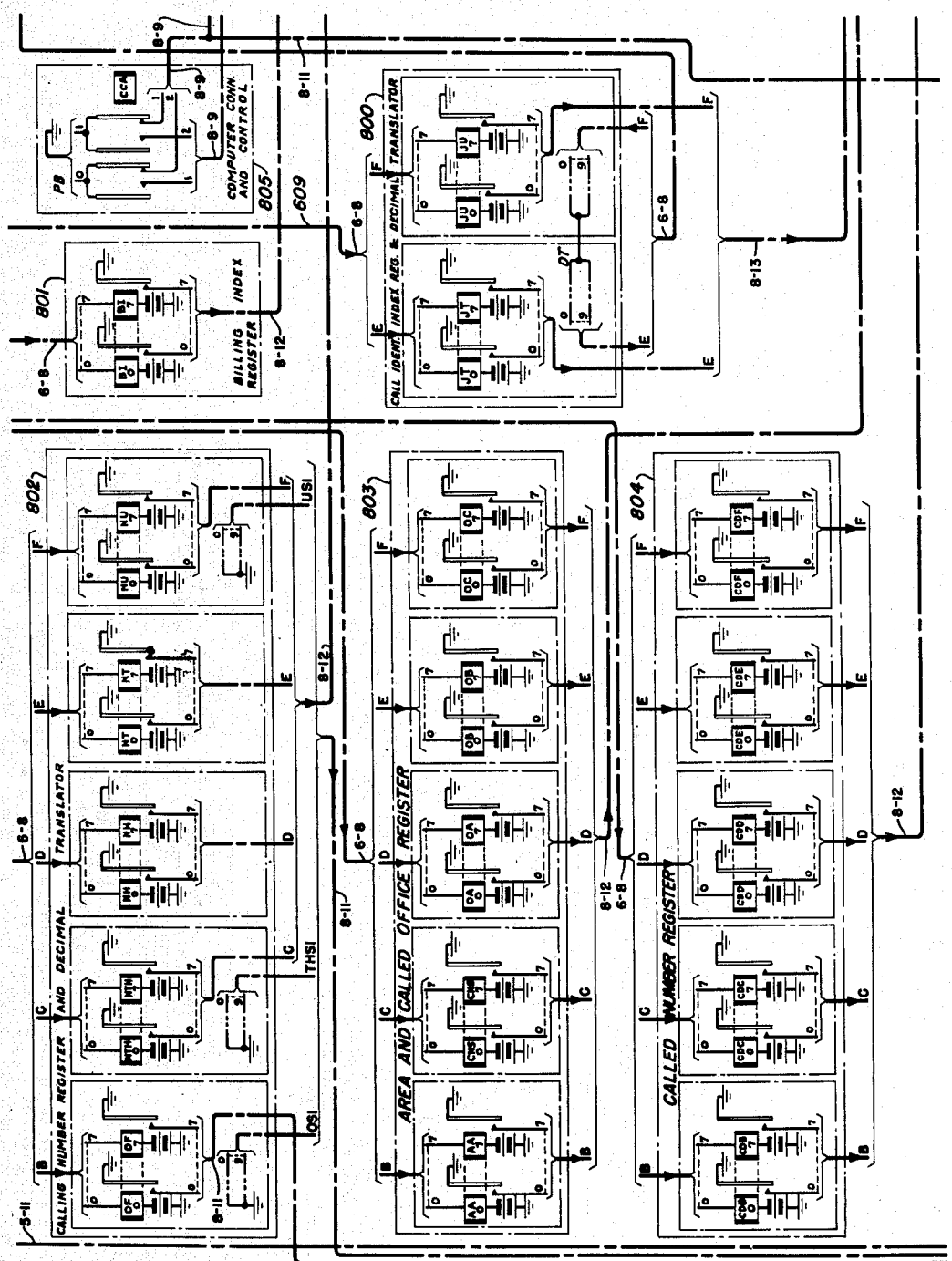
FIG. 8
INVENTORS A.E. JOEL, JR.
R.O. RIPPERE
BY
ATTORNEY INVENTORS A.E. JOEL, JR.
R.O. RIPPERE
BY John A. Hall
ATTORNEY INVENTORS A.E. JOEL, JR.
R.O. RIPPERE
BY John A. Hall
ATTORNEY INVENTORS
A.E. JOEL, JR.
R.O. RIPPERE
BY John Hall
ATTORNEY March 3, 1953 A. E. JOEL, JR., ET AL 2,630,270
AUTOMATIC ACCOUNTING DEVICE
Filed June 24, 1949 18 Sheets-Sheet 13

FIG. 15

INVENTORS: A. E. JOEL, JR.
R. O. RIPPERE
BY *John A. Hall*
ATTORNEY

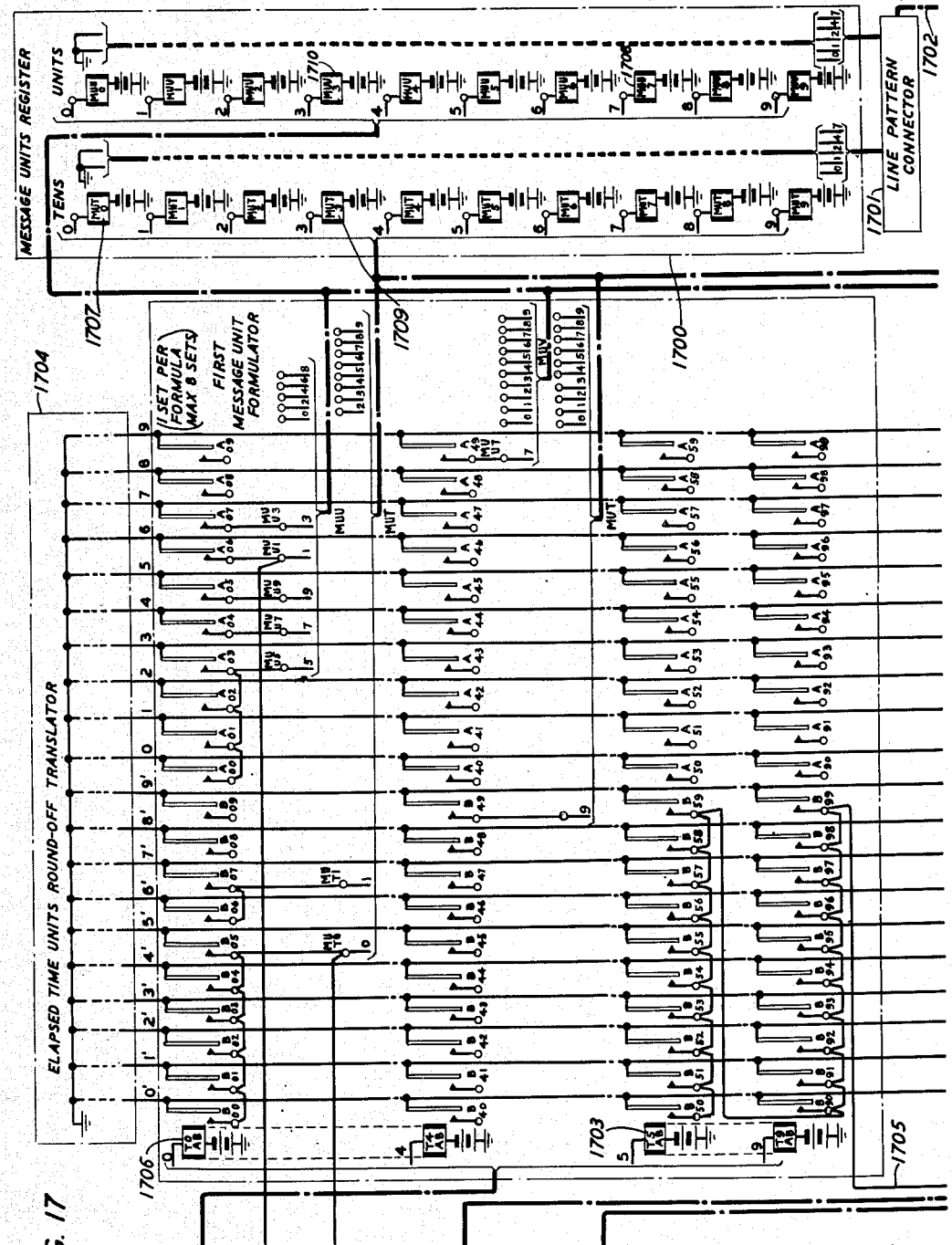

March 3, 1953  A. E. JOEL, JR., ET AL  2,630,270
AUTOMATIC ACCOUNTING DEVICE
Filed June 24, 1949  18 Sheets-Sheet 16

INVENTORS: A. E. JOEL, JR.
R. O. RIPPERE
BY John A. Hall
ATTORNEY

INVENTORS: A. E. JOEL, JR.
R. O. RIPPERE

ATTORNEY

Patented Mar. 3, 1953

2,630,270

UNITED STATES PATENT OFFICE 2,630,270

AUTOMATIC ACCOUNTING DEVICE

Amos E. Joel, Jr., New York, and Robert O. Rippere, Massapequa, N. Y., assignors to Bell Telephone Laboratories, Incorporated, New York, N. Y., a corporation of New York Application June 24, 1949, Serial No. 101,088

8 Claims. (Cl. 235—61.7)

This invention relates to automatic accounting systems and particularly to systems wherein records automatically produced by and of customer uses of given facilities over variable time periods are processed by electrical devices in a number of steps to produce customer bills for the services rendered.

The object of the invention is to provide means for collecting and correlating data scattered through one or more record tapes or equivalent media, to calculate the charges to be made and to translate the collected and correlated data into a form required for printing.

The present invention is exemplified herein in a plurality of circuit details of one of the electrical devices employed for one step in an automatic accounting process, that device known as the computer. This device, like the other devices employed, is arranged to take records from an incoming or old perforated tape, to modify the records in accordance with the purposes for which it is adapted and to produce a plurality of outgoing or new perforated tapes therefrom.

The original tape, automatically produced by customer use of given facilities contains scattered items of specific information, such as the initial entry, the answer or start time and the disconnect or termination time for each customer use and other items of general information, such as the general location of the using customer's facilities, the date, the hours and the identity of the billing period. This tape in a specific arrangement of an accounting system is employed as an incoming tape in a device known as an assembler, which collects or assembles the various and scattered items of specific information.

The next step in the accounting process is performed in the computer which takes the assembled items of specific information, calculates therefrom elapsed time, modifies the result in accordance with a billing index which indicates the rate of charges, translates this result into a number of unit charges (message units in an automatic message accounting system) and distributes the calculated charges along with accompanying details to one or another of a plurality of outgoing tapes.

In a specific embodiment of the invention the computer is provided with a reader for entering data from an incoming tape into its calculator and registers and nineteen perforators for distributing the processed data to nineteen outgoing tapes. There will be ten of such perforators assigned to the recording of message unit charges. If the tape is from a marker group serving more than one office, then as many of these perforators as there are offices will be used so that a separate outgoing tape for each office will be prepared. If the marker group contains but a single office then the charges will be sorted on a decimal basis either in accordance with the thousands digit of the called line number or in accordance with the units digit thereof. There will be six of such perforators assigned to the recording of detail calls, that is calls, the details of which will be reported on the customers' bills. Since the central office tapes are recorded by "rounds" and since the longest round provided for will consist of six days, then six perforators are provided so that the detail calls may be sorted by days. There will be one perforator assigned to the recording of irregular calls such as straddle calls or those occasional calls which exceed the capacity of the device such as those extending over a period of time greater than ninety-nine minutes. There will be one perforator assigned to the recording of the details of message unit calls where these details are sought for monitoring or other purposes by the customer. The customer's bill will nevertheless be rendered on the message unit basis so that a particular message unit call will be processed by the computer and two records produced therefrom, one in short form on one of the regular message unit tapes for billing purposes and another in longer form on the message unit detail record tape for supervisory purposes. And lastly there will be one perforator assigned to record the line observed calls, that is, a record made of all calls originated on certain lines put under observation under routine or on account of customer complaints.

The first seventeen output tapes including the ten message unit tapes, the six detail call tapes and the irregular call tape will contain billing information whereas the last two, the message unit detail call and the line observed call tapes will contain reference information. The distribution of calls to these nineteen outgoing channels is a function of the computer and in most cases is controlled by some index in the initial entry of each call, but may in other cases be controlled by extraordinary conditions derived or detected by the computer itself, as when the elapsed time calculated exceeds two digits (99 minutes). Thus, the computer translates, calculates, computes, sorts and otherwise rearranges the items of information found on an incoming tape to form a plurality of outgoing tapes carrying the thus processed information in another form.

By way of illustration, a number of examples of assembled call information as they appear on the incoming tape and as they are transformed for perforation on one or another of the outgoing tapes are given with a short explanation of certain features of the transformation.

(1) A message unit call entered as:

135246
131746
213046
005444 which is a call made from office 0 of the given marker group (identified in the tape identity entries) from calling line 5444, and extending from 31.7 minutes to 35.2 minutes. The billing index (3), we will assume will cause the calculation of 3.5 minutes of elapsed time to indicate 2 message units, so that the computer will form and cause to be perforated on the number 5 perforator (thousands digit of calling line number, assuming a single office in the given marker group) the following output line:

125444

(2) A message unit call entered as:

135237
117537
214037
031234 which is a call from office 3 of the given marker group (identified in the tape identity entries) from calling line 1234 and extending from 17.5 minutes to 35.2 minutes. The billing index (4) we will assume will cause the calculation of 18.7 minutes of elapsed time to indicate 12 message units so that the computer will form and cause to be perforated on the number 3 perforator (sorted by office when the latter group contains more than one office) two output lines:

201234
000012

(3) A message unit call entered as:

101673
281021
156273
213073
005444 is one very similar to Example No. 1 except that it also includes an hour entry. The elapsed time is calculated as follows:

+01.6
+60.0
−56.2
———
+ 5.4

If this in combination with the billing index indicates 3 message unit calls then the output will be:

135444

(4) A message unit call might appear as:

101652
231899
156252
213052
005444

The second line in this case is known as an irregular hour entry and while it does not show the actual hour it nevertheless sets the hour circuit back an hour so that the calculation is identical with Example No. 3 and the output line will be:

135444

(5) Should a call appear as follows:

101657
281021
281020
156257
213057
005444 then the calculation of elapsed time would be as follows:

+ 01.6
+120.0
− 56.2
———
+ 65.4

Assuming that this elapsed time will indicate 27 message units, the output becomes:

235444
000027

(6) If the line 5444 of Example No. 1 were under observation, then the input to the computer would be as follows:

135246
131746
243046
005444
051133
010000

The entry index (the B digit of the first line of the initial entry) is 4 instead of 1 as in the first example, and two supplementary lines giving details of the called number are added. In this case the computer forms and causes to be perforated on the number 5 perforator, as before, the output line:

125444

This is billing information and will eventually be the data from which the customer's bill is made up.

In addition the computer forms and causes to be perforated on the line observation tape the following:

105444
062511
051133
010000
000402

This is supervisory information and is not used in forming bills but goes to company officials for various purposes such as routine checking, or for answering complaints, etc. The second line is formed by a translator from an assumed date (15th), hour (21) and answer time (31). The third and fourth lines are copies of the last two lines of the assembled call and the last line has a record of the message unit index (0), the chargeable time (04—rounded off from 3.5) and the number of message units charged (02).

(7) In Example No. 6 if the third line had been 233046 instead of 243046 then a message unit detail call is indicated. In such case the output line will be 125444 as before and the five-line detail information record will be exactly the same except that it will be perforated on the message unit detail tape instead of the line observing tape and will eventually go to the customer for his information.

(8) A detail call read from the incoming tape as:

```
135213
131713
239013
005444
051133
010000
``` will be processed and distributed to the detail call output tape as:

```
105444
062511
051133
010000
000400
```

The first line of this output gives the calling line number. The second line is the start time line which is synthesized from the day (15), the hour (21) and minutes (31). The third and fourth lines are copies of the last two lines of the call as entered and the last line shows the chargeable time as 04 minutes. Note the difference between this and Example No. 6 where the number of message units (02) appeared as the last two digits of the last line. In the present case the message billing index (9) in the third line 239013 of the entries read from the incoming tape is a means which causes the last two digits of the last line of the processed call perforated on the detail call tape to be blanked out as 00.

(9) With a very slight difference, the digit 4 instead of the digit 3 as the B (or second) digit of the first line of the initial entry as:

```
135213
131713
249013
005444
051133
010000
``` the following record:

```
105444
062511
051133
010000
000400
``` will be perforated in both the line observing output tape and the detail call tape.

There are many variations of the above described patterns to take care of operating contingencies which need not be described herein in detail. One of the important circuits of the computer but which in fact gets less use than others is the so-called straddle circuit for taking care of a variety of irregular calls and which are mainly recorded so that an operator or clerk may investigate the irregular circumstances and prepare a bill by hand.

In general, the computer consists of a plurality of registers into which both items of specific information and items of general information may be entered, a calculator, steering means, line forming pattern means, and distributing means. Specific details of a call are entered, the elapsed time is calculated and this is weighted, rounded off and converted into charges, either chargeable time or a number of message units.

Again, generally the first items of information entered in the computer are the recorder number the hour and the day and these are registered before any specific problem is presented for calculation and remain registered until a complete group (for a single call identity index) of calls has been processed. During the processing of this group the hour and the day registrations are changed from time to time by the occurrence of an hour entry found among the scattered items of specific information.

The first of the specific items of information to be registered are the two items fixing the start and end of the customer use of the facilities and from these the calculator derives the elapsed time and transmits this to an elapsed time register where it is held under control of an output control circuit. Generally the elapsed time may be calculated and registered before the initial entry giving other details of the customer use can be completely registered and the output lines formed and transmitted. To save time, an overlapping arrangement is employed, whereby after a calculation has been made and the elapsed time has been transferred to the elapsed time register but before the computer has transmitted the patterned lines to an output tape, the time element lines of the next call are entered in the calculator.

After the complete information has been registered in the computer the output control will cause the selection of a particular output channel and will transmit thereto the patterned lines such as those explained hereinabove.

A feature of the invention is a means for automatically controlling the sorting which will be performed in the computer. It has hereinbefore been set forth that the computer in addition to calculating elapsed time for each call and otherwise placing the computed result for each call in practically final condition for printing or otherwise reporting also does a certain amount of sorting. Where a central office tape is made by a marker group containing more than one office, then the computer may be employed to distribute the computed calls to several output tapes each containing calls originated from a different office. The computer, as well as each of the other processing devices employed, has a number of manually controlled switches, among which are two for indicating the marker group (a tens and a units) and these have contacts which may be cross-connected at will. As a specific example when the switches MGT (marker group tens) and MGU (marker group units) are set to indicate marker group 11, and it is known that this marker group has two offices, then a path will be closed through contacts controlled by these switches to cause the operation of a relay SBO (sort by office) and other paths will be closed to enable two of a plurality of perforators so that one output tape for each of the said two offices may be made.

Another feature of the invention is a similar cross-connection arrangement whereby the billing index included in each initial entry will cause connections to be closed through connections established by the said marker group switches so as to control the computer at the proper rate for each call. The proper billing rate is, therefore, jointly controlled by the message billing index included in the initial entry of each call and the marker group designation for the tape being processed.

It may be repeated here that the marker group designation which must be established manually on the device is part of the tape identity information and must be properly set in order to enable the computer (or other processing device). Thus the determination as to whether sorting by offices shall be employed with a given input tape and how many output tapes shall be formed as well as the manner in which the message billing index shall be handled is selectively preset for each tape processed.

In the operation of the computer there is certain information in each call processed which is of a general nature and is, therefore, common to all of the calls on a tape. Such general information is included in the identification of the "marker group," a term meaning the central office apparatus serving one or more central offices. The identification of the marker group is included in the tape identification codes at the ends of each central office tape and is carried forward during each of the processing steps of the automatic accounting system as it is needed in the final translation at the printer where the identification of the calling office is translated from a code to the form typed on the customer's bill. Since no marker group will ever include more than ten offices, a simple single-digit number in the initial entry (items of specific information) may be made to identify a particular office. Because the computer or other accounting device is equipped with a pair of manually adjusted switches (tens and units) for setting the circuits to any given marker group number, this setting may be made to channel any single-digit office designation to a circuit for identifying the office by name. Thus if the marker group is identified as 11, and two offices therein are identified as 4 and 9 the complete identification may be as follows:

| Marker Group | Office Group | Office Name |
| --- | --- | --- |
| 11 | 4 | MA2 (Marvel 2) |
| 11 | 9 | MO5 (Monument 5) |

Other information, in like manner, is derived from the combination of a single digit number included in the items of specific information pertaining to a particular call and this item of general information pertaining to all the calls on a tape. Thus, as another example, the billing index in combination with the marker group establishes the charging rate.

Since the office names and the charging rates may vary widely and may be quite different for tapes which are to be processed by different accounting centers, a flexible arrangement is provided by a cross-connecting device. Therefore, when in the course of its operation the computer requires the charging rate, a temporary connection is made to such cross-connecting circuit and a charging rate is derived therefrom by the combination of the marker group number set up on the tape identification switches and the billing index registered for the particular call being processed.

A feature of the invention may then be stated as means controlled by an item of general information whereby an item of specific information may cause a condition identified by the combination of these two items and established through a cross-connecting circuit to be applied to a control circuit.

In the present embodiment of the invention there is a multiple of ten leads, eight of which each correspond to one of the possible eight message unit billing indices. Leading from this multiple are a plurality of branch circuits controlled by various relays each selectively operated through a different marker group number and thus leading to a large plurality of cross-connecting terminals so that various control conditions to meet the commercial practice may be set up.

Another feature of the invention is a built-in table for evaluating the number of message units that must be charged for so many minutes of elapsed time in the customer use of the given facilities. In outline there is provided a plurality of charge plan relays which are selectively operated in accordance with the combination of the billing index and the marker group identification as hereinbefore set forth. Each such charge plan relay will then control a large plurality of paths through a (mathematical) table arrangement to translate elapsed time (tens and units) into message units (tens and units). The table arrangement is inherent in the contact arrangement of the elapsed time relays which are operated by the charge plan relays, but in order to render the device flexible so that adjustment in changes in rate may readily be made a cross-connecting means is inserted between the contacts of the elapsed time relays and the message unit registering leads. A feature of the invention may then be stated as the provision of a control relay for each different charging plan for controlling the means for translating elapsed time into charge units and which control relay is selectively operated in accordance with the combination of an item of specific information and an item of general information.

The drawings consist of eighteen sheets having twenty-one figures as follows:

Fig. 1 is a perspective view of the racks and cabinets in which the device of the present invention is housed and is intended to give a general view of the device;

Fig. 2 is a highly schematic showing of the basic switching circuit employed herein;

Fig. 3 is a block diagram showing how Figs. 4 to 13, inclusive may be placed to form a more detailed but yet a schematic-like use of the elements of the present invention and in which:

Fig. 4 shows the reader and the reading relays by which the input tape is scanned;

Figure 6:
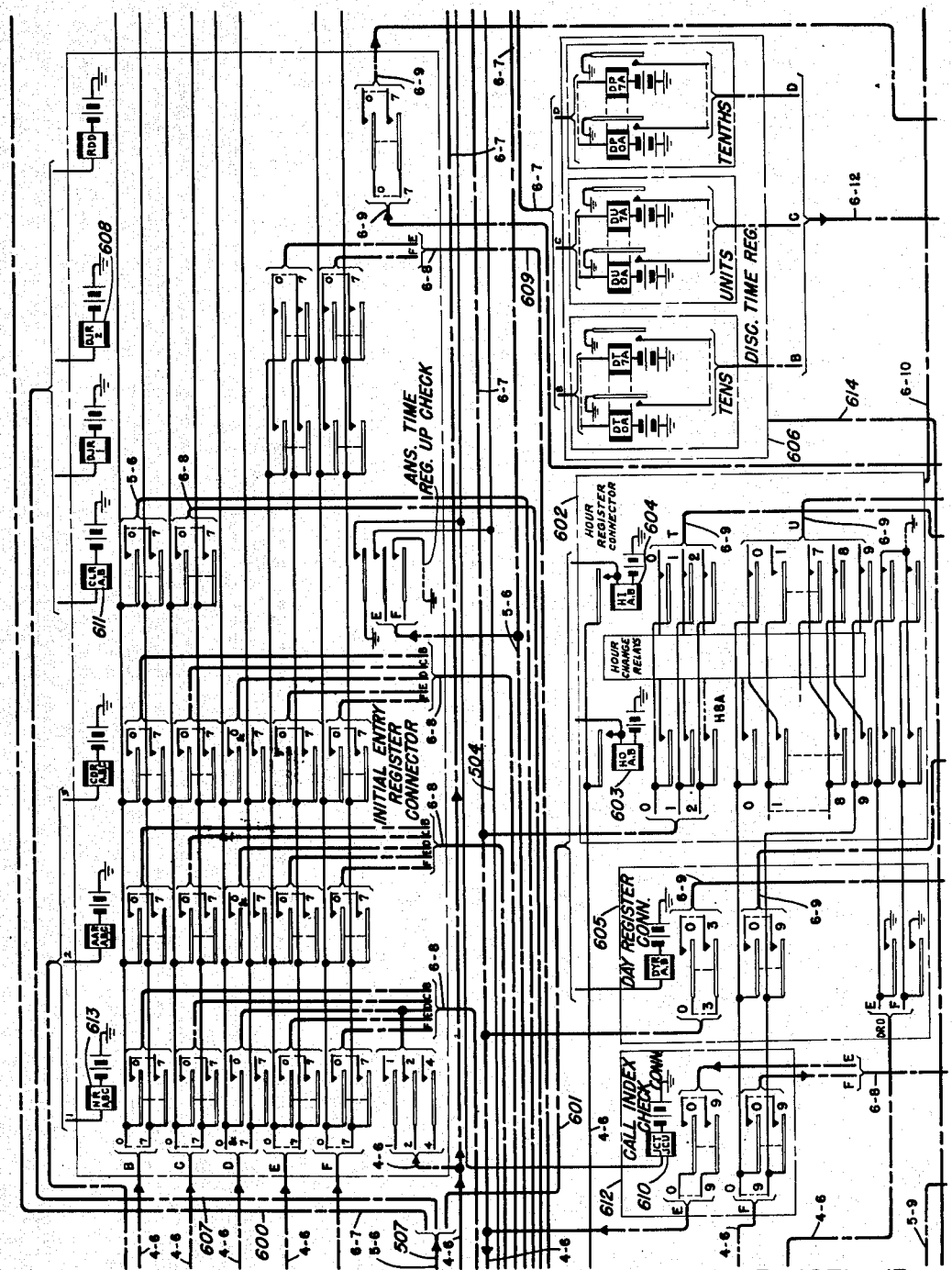
Figure 7:
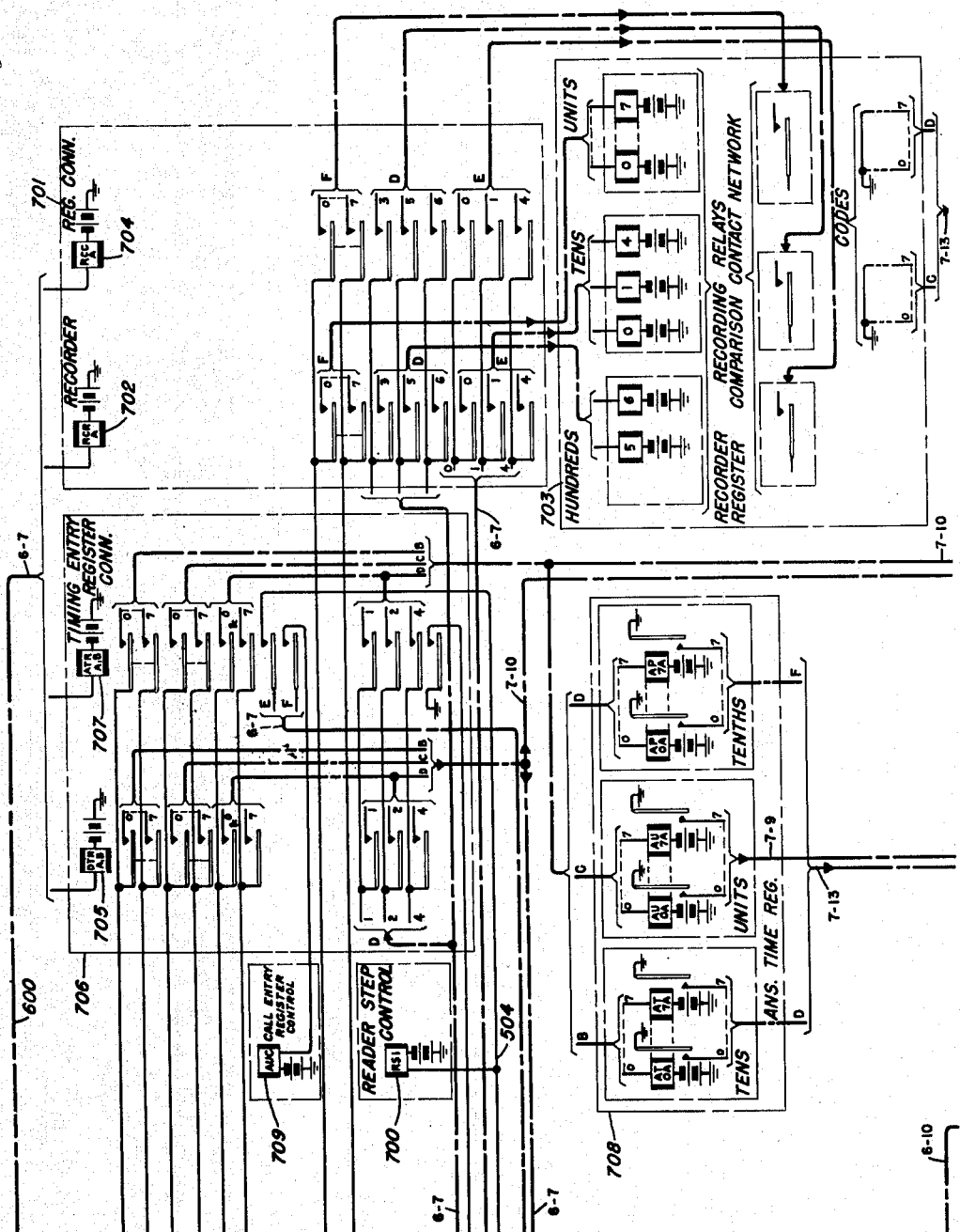
Figure 9:
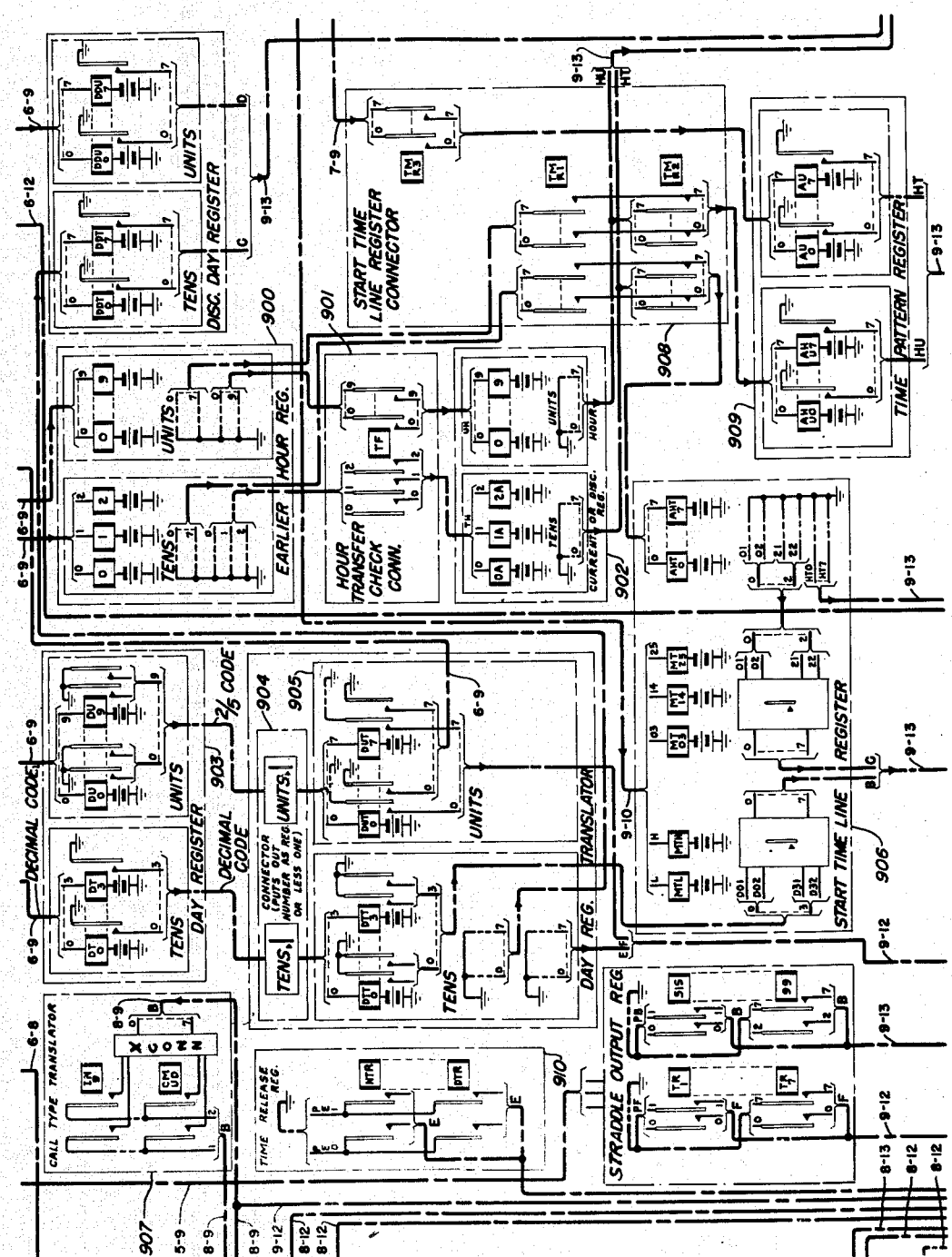
Figure 10:
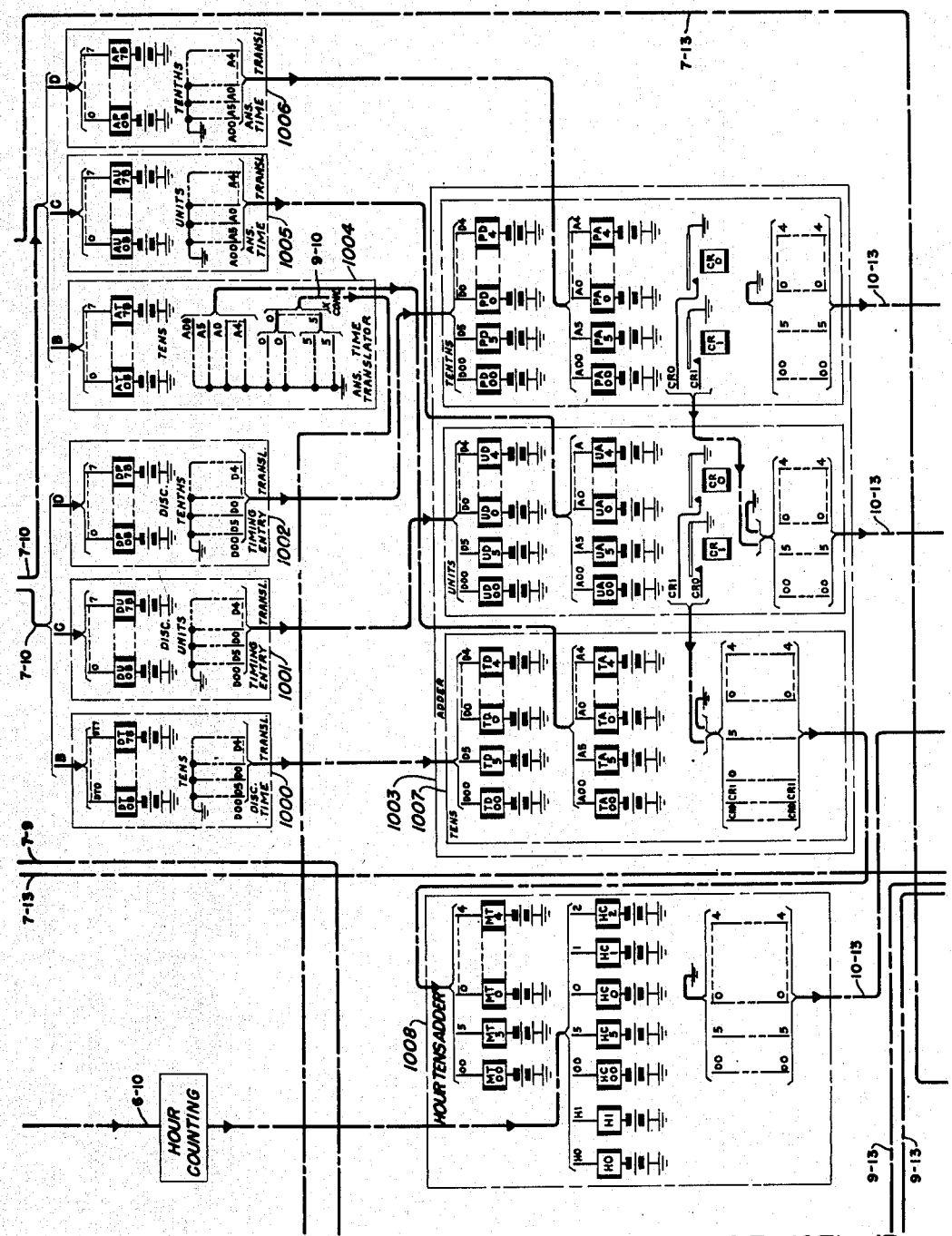
Figure 11:
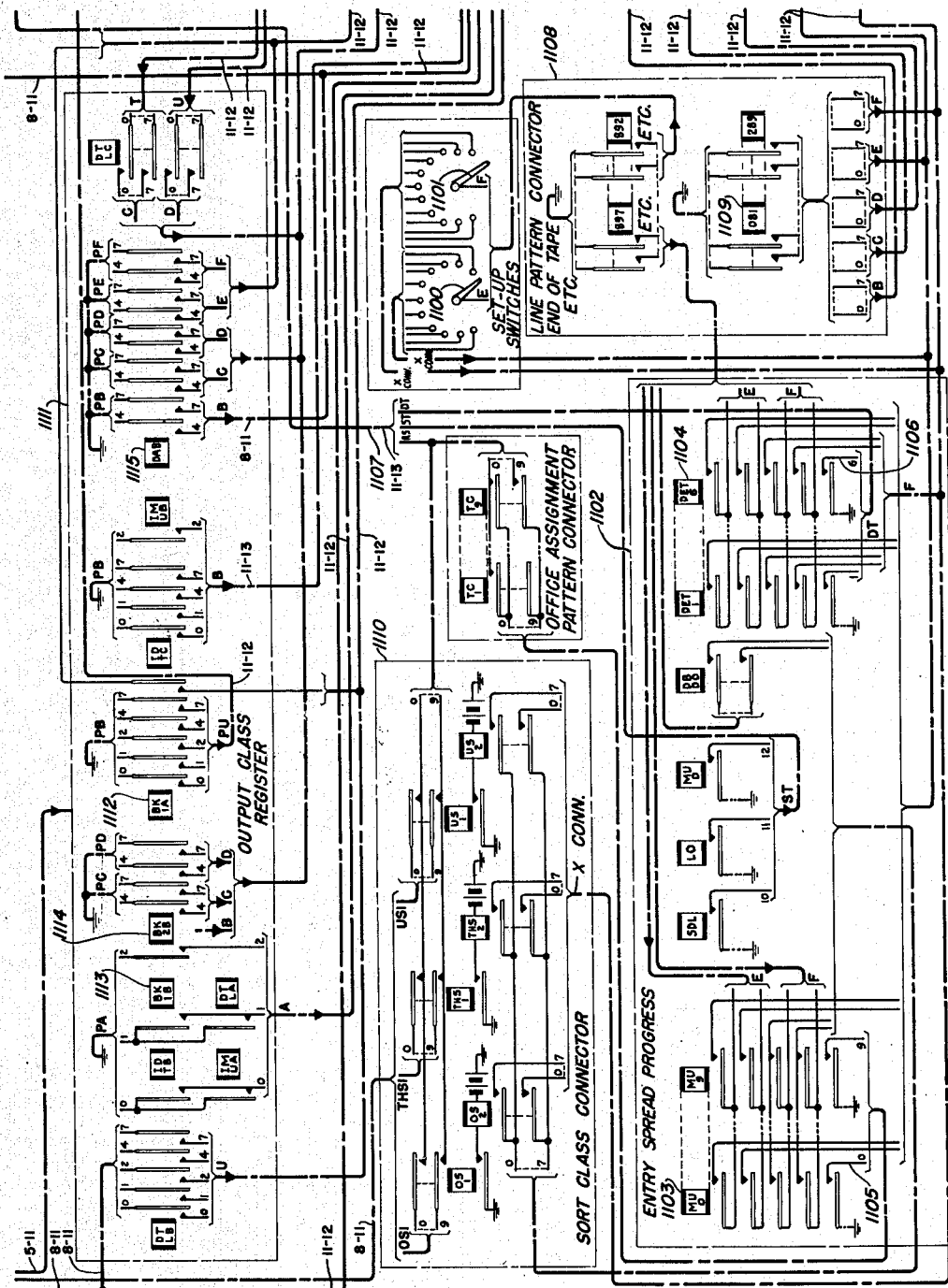
Figure 12:
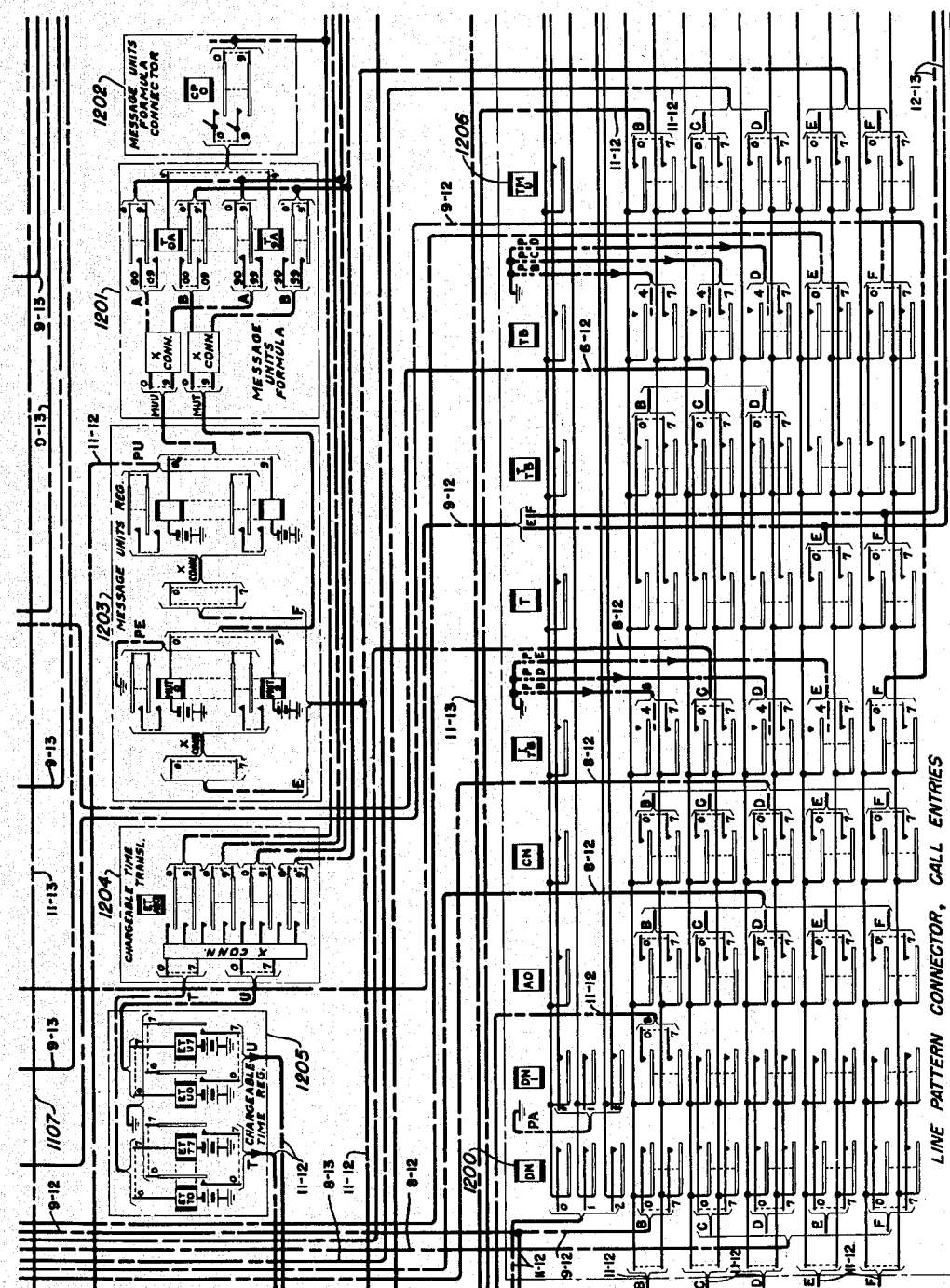
Figure 13:
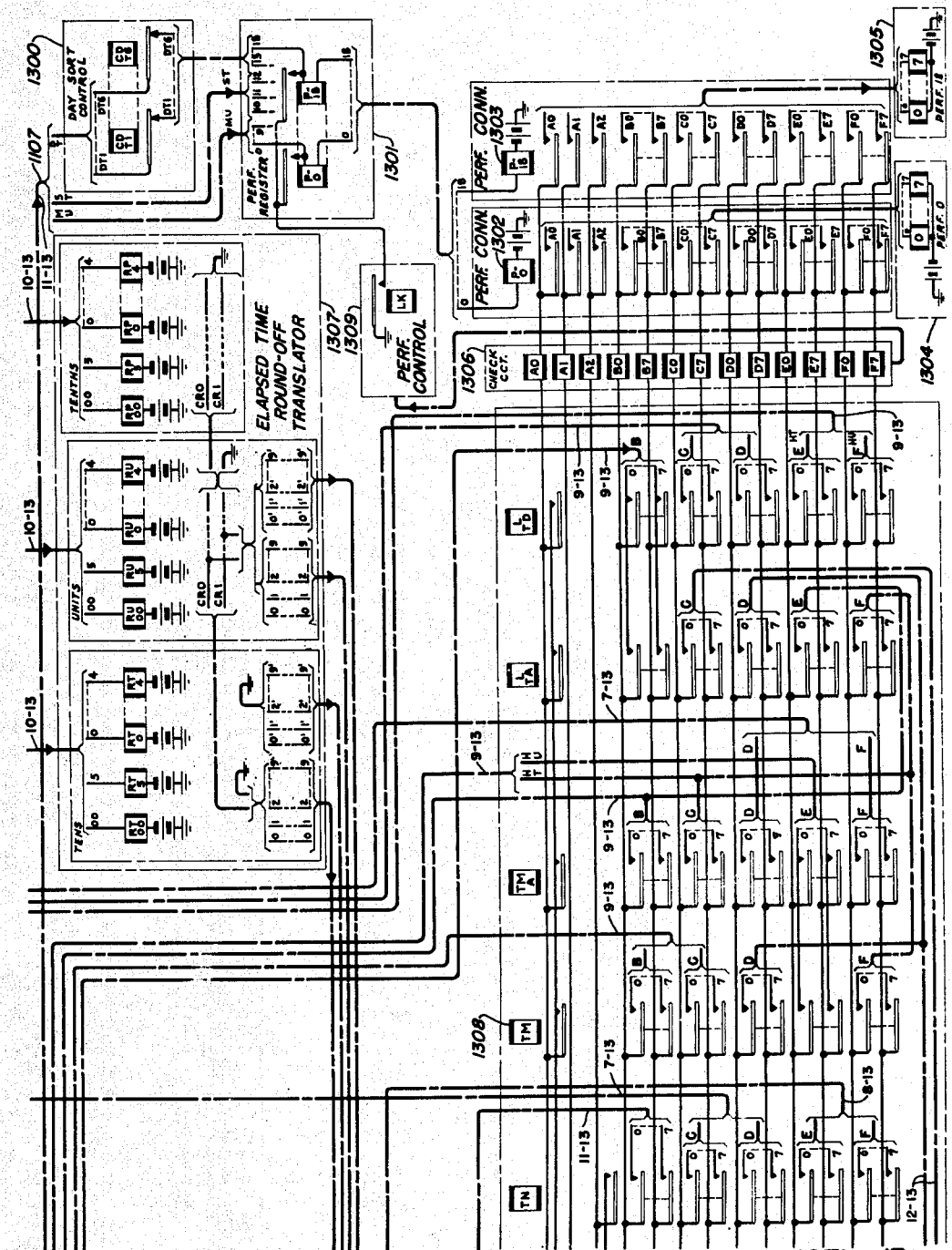
Figure 14:
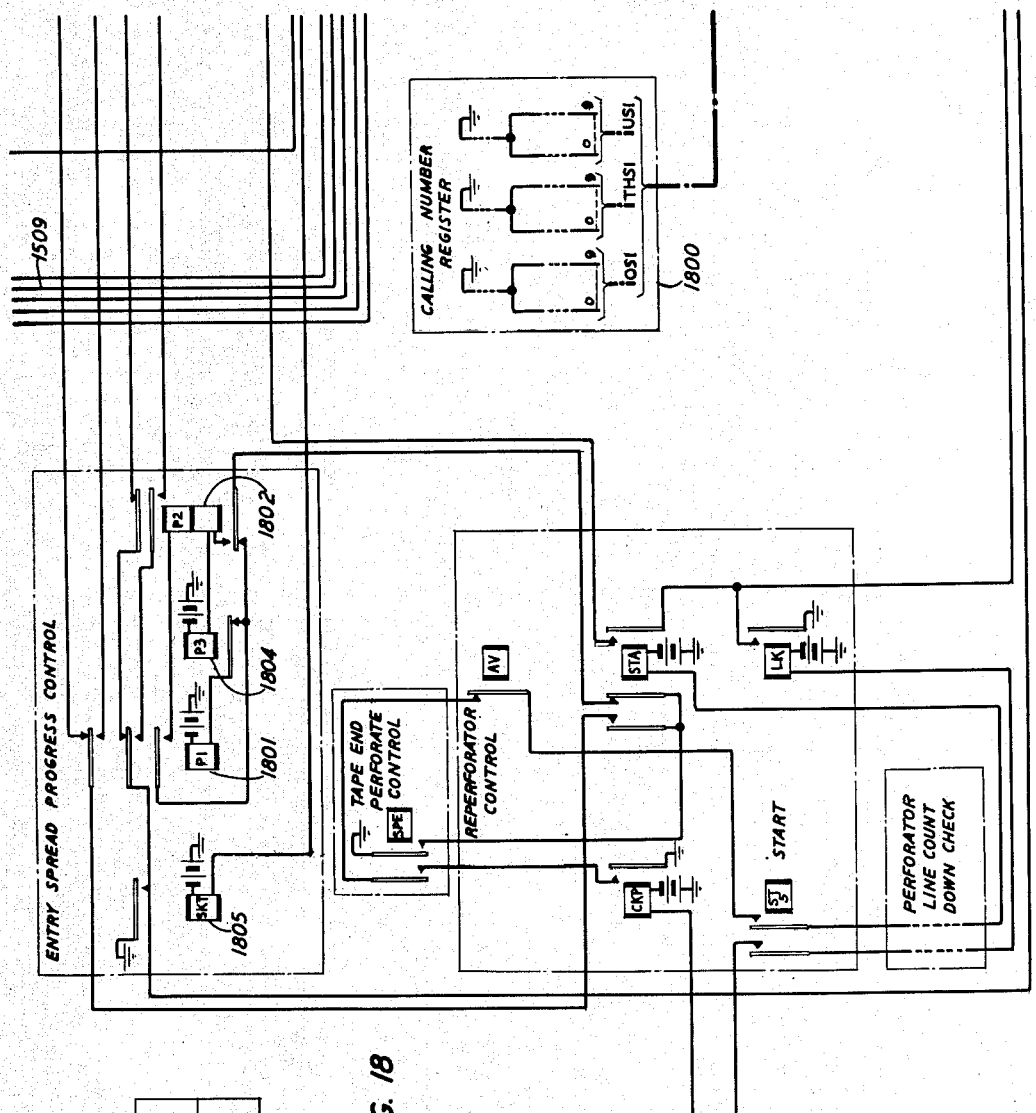
Figure 16:
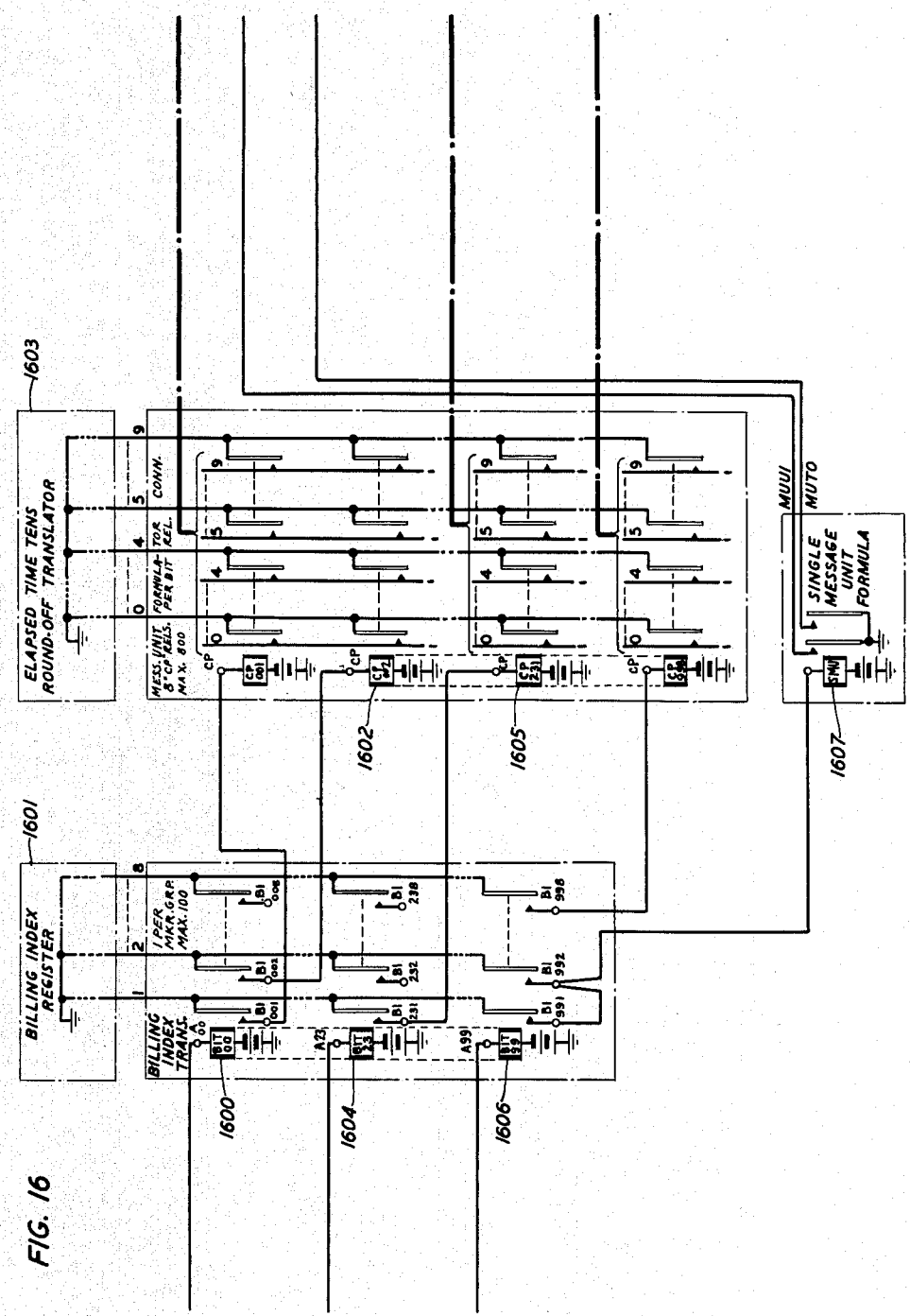
Figure 19:
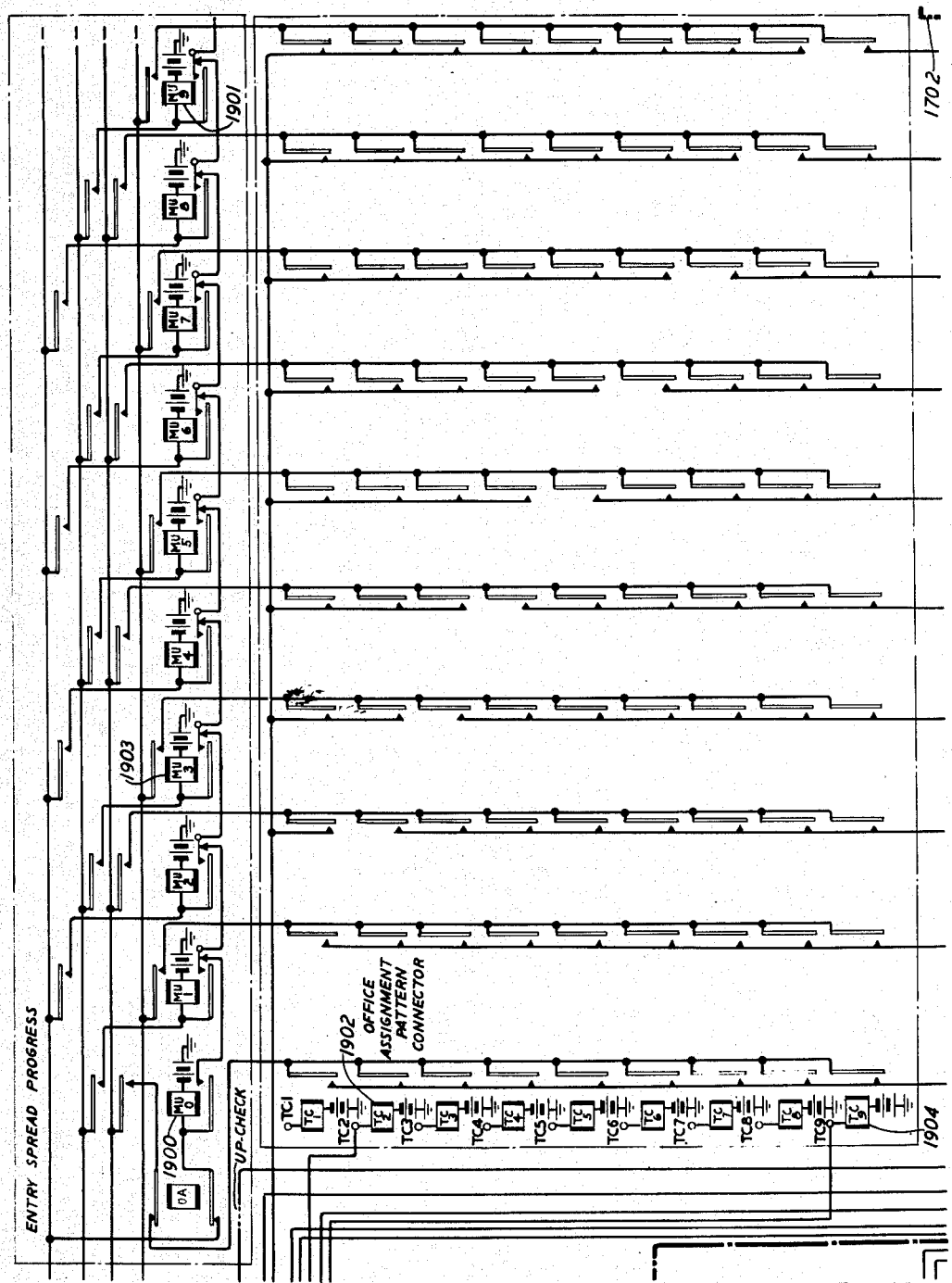
Figure 20:
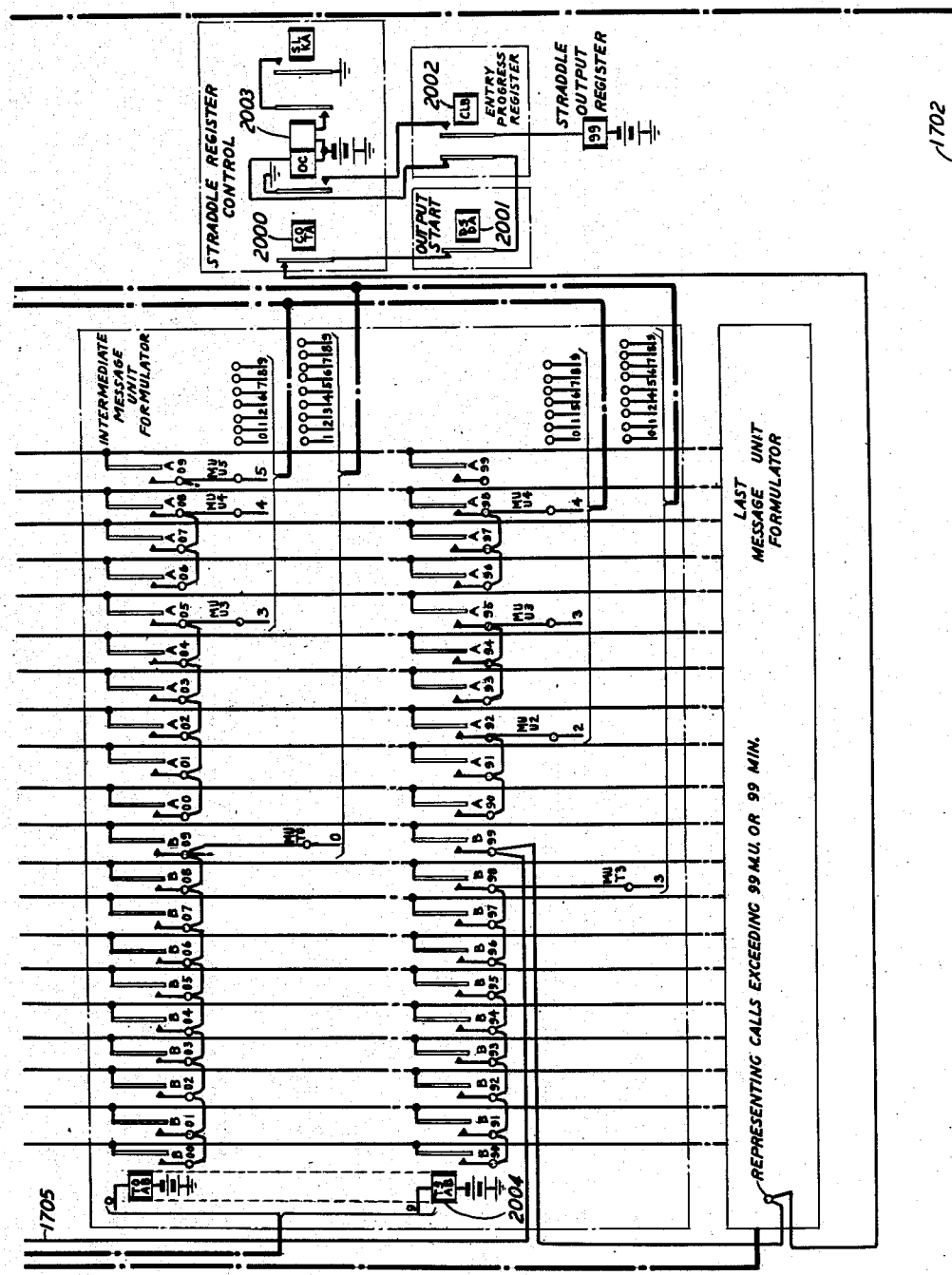
Figure 21:
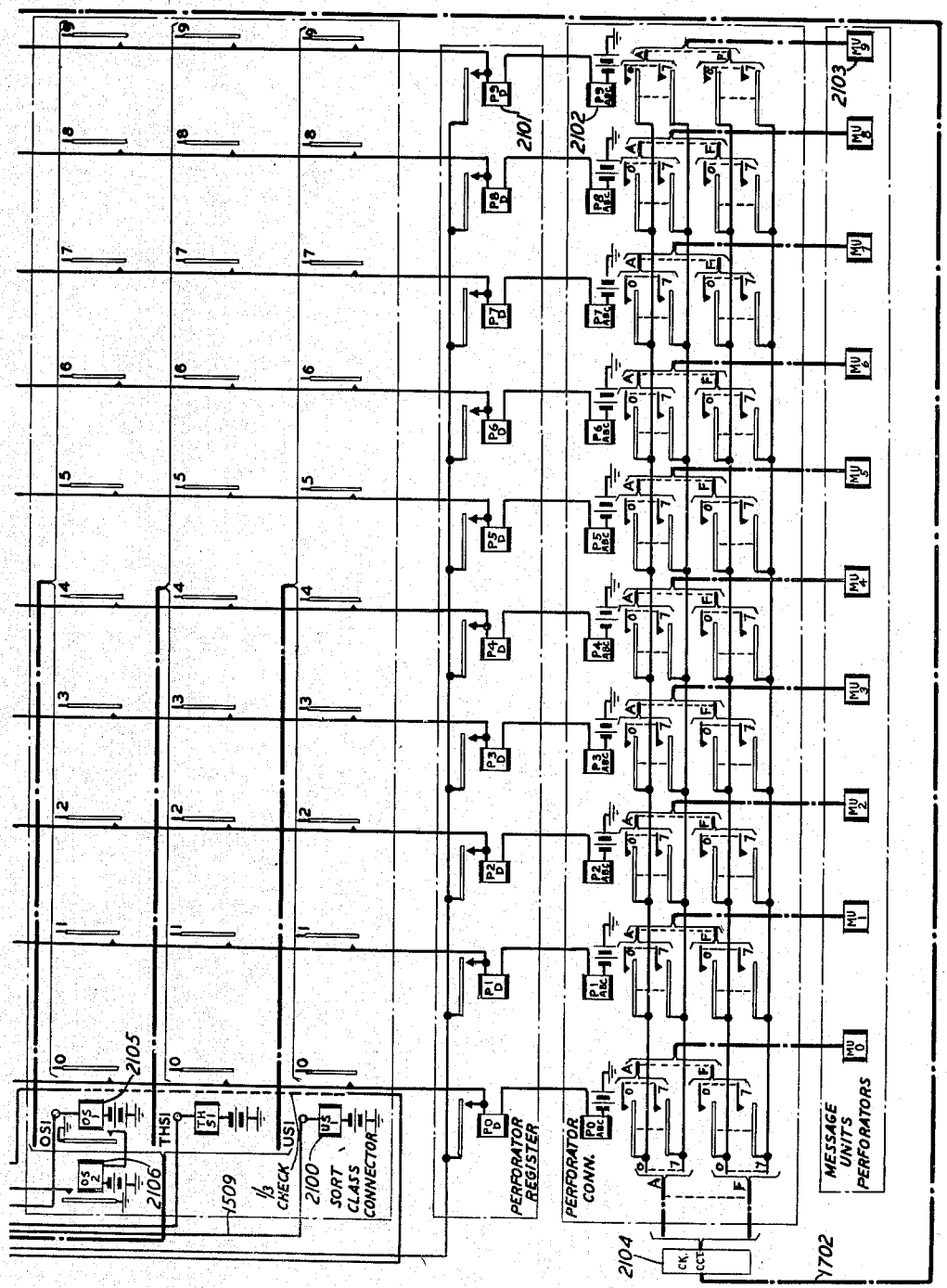

Fig. 5 indicates the location in the circuit arrangement of the reader line count means, the reading relay translator and the control circuits;

Fig. 6 shows a number of register connectors and indicates the disconnect time register;

Fig. 7 likewise shows a number of register connectors and indicates the answer time and the recorder register;

Fig. 8 shows the calling number register, the area and called office register, the called number register, the billing index register and the day and junctor register and decimal translator;

Fig. 9 shows the call type translator, the day register, the time release register, the day register translator, the straddle output register, the start time line register, the earlier hour register, the hour transfer check connector, the disconnect register, the disconnect day register, the start time line register connector and the time pattern register;

Fig. 10 shows the adder; that part of the computer which performs the mathematical functions thereof;

Fig. 11 shows the output class register, the sort class connector, the entry spread progress circuit, the office assignment pattern connector, the set-up switches and the line pattern connector for the end of tape perforation;

Fig. 12 shows the chargeable time register, the chargeable time translator, the message units register, the message units formula device, the message units formula connector and the line pattern connector for call entries; and Fig. 13 shows the elapsed time translator, the day sort control, the perforator register, the perforator control, part of the line pattern connector for call entries, the check circuit therefor and indicates two of a plurality of perforator connectors and the associated perforators;

Fig. 14 is a block diagram showing how Figs. 15 to 21, inclusive, may be arranged to form a schematic circuit diagram of the specific features of the present invention and in which:

Figure 15:
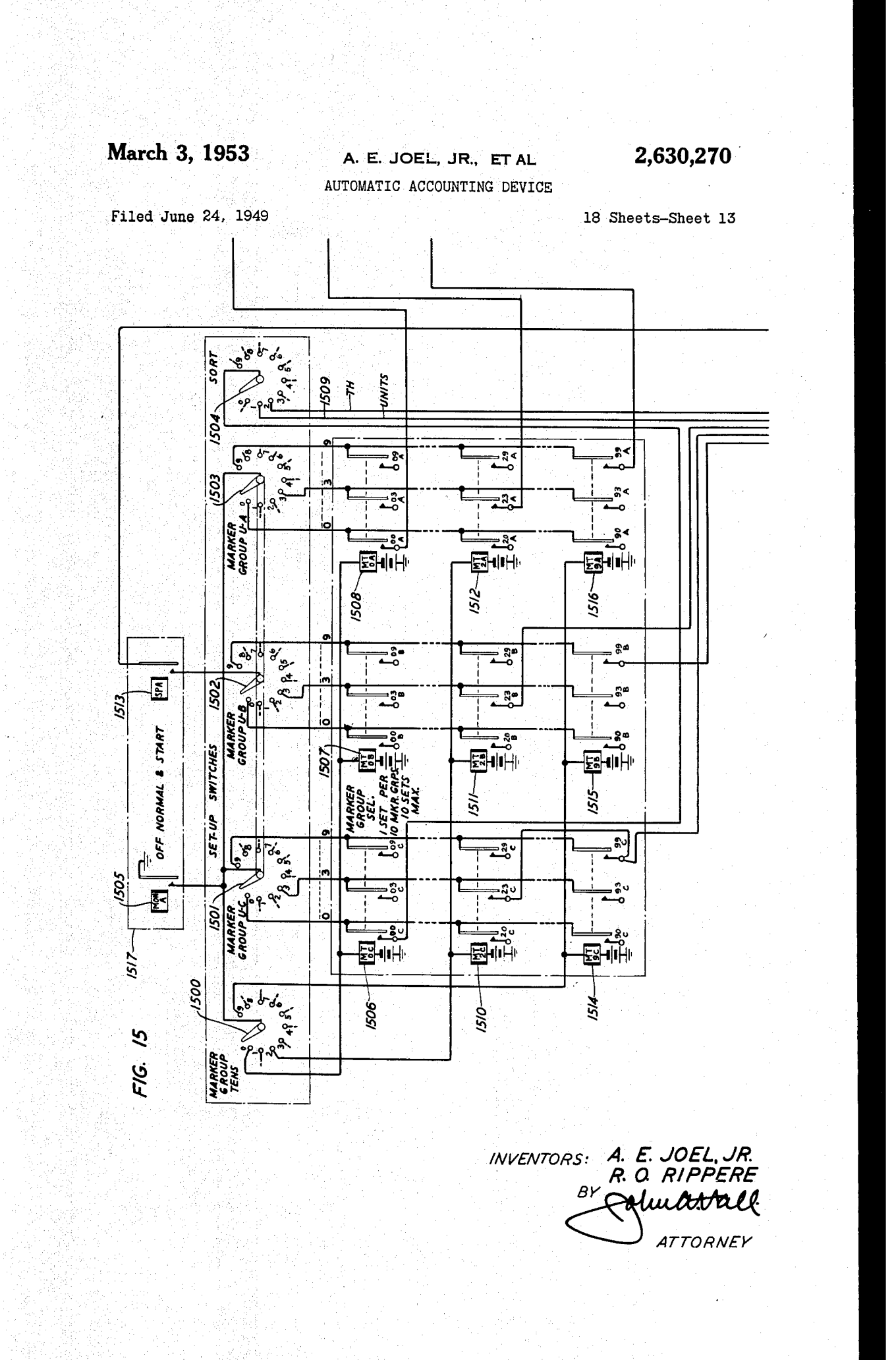

Fig. 15 shows the set-up switches and the relays operated thereby;

Fig. 16 shows a plurality of translator relays operated through the combination of a general item of information and a specific item of information;

Figs. 17 and 20 show a translator operated through the translator of Fig. 16 and the derived elapsed time to formulate the value of the customer charge and in which:

Fig. 17 also shows the message unit register into which the derived charges may be placed;

Fig. 18 shows in abbreviated form the sort control means;

Fig. 19 and part of Fig. 21 show the means for selecting the output channel into which a derived charge is diverted and a secondary sort control operated from the general information established on the set-up switches and confirmed by the incoming tape identity information;

Fig. 20 further shows a control means operated by the supervisory straddle circuit; and Fig. 21 further shows the various output perforators together with an indication of the perforator connector circuit controlled by the selective means of Figs. 19 and 21.

In the following description the various relays are designated by both letters and numerals which have come to have certain significance to persons familiar with the technical details of the disclosed arrangements. By way of example, the reading relays are known as the A0, A1 and A2 relays for the first group thereof used to register the A digit of the six-digit line used in the automatic accounting system tapes. In the present case, there are three relays in the first or A set and five relays such as the B0, B1, B2, B4 and B7 relays in each of the remaining five sets. In a great many cases a relay will have only such an alphabetic designation but in other cases it will have in addition a numerical designation which always consists of the figure number plus two other digits, whereby the location of a piece of apparatus can be at once found by turning to the corresponding figure number. Where conductors are designated by numerals in addition to the usual alphabetic designation thereof the number used will be a combination including the figure number wherein the conductor is first picked up in the tracing of a circuit and this number will be retained even though the conductors extend through another large number of circuits. Another convention used herein for the sake of clarity is a numbering scheme for the cables or bundles of conductors which must be carried over long distances. This is the use of a hyphenated number such as 29-118 indicating that this cable or bundle of conductors extends between Fig. 29 and Fig. 118.

For obvious purposes, in certain cases, conductors will bear the same alphabetic designation as other apparatus. This is not to be taken as a duplication of the designation but will be readily understood that such a conductor bears an intimate relation to the other piece of apparatus.

Similar logical means for designating various elements of the circuits will be found in the drawings and are used as an aid to the clear understanding of the present arrangement.

The exemplified embodiment of the present invention, as disclosed herein, comprises apparatus mounted in practice in or upon a cabinet or cabinets, a control panel, and a relay rack of the general nature illustrated in Fig. 1. Many mechanical details of the mounting arrangement are not discussed herein either because they are well known in the art, would readily be devised by those skilled in the art, or described and disclosed elsewhere, or for a combination of these reasons.

The operative apparatus includes relays, a tape reader, tape perforators, otherwise designatable as recorders, and auxiliary equipment for supplying tape and storing the used or reproduced tapes.

The tape reader is disclosed in the application of W. W. Carpenter Serial No. 666,280, filed May 1, 1946; obviously other devices of similar function may be employed.

The tape perforators may consist of devices such as disclosed in the application of W. W. Carpenter Serial No. 588,401, filed April 14, 1945, now Patent No. 2,583,086.

The disclosure of the present application is related to the disclosures of a group of patents and applications generally relating to equipment which may constitute an accounting office. The object of an accounting office from the over-all view-point is to process a tape of the kind produced in a central office having recorded thereon data relative to telephone calls specifically originating in or, more generally, set up through or by means of said central office and to process said tape with the ultimate result of producing through successive steps typed records giving the details of toll calls made by each subscriber during a given period of time, typed message unit records giving the number of units to be charged to each subscriber for a given period of time in cases where such subscribers are billed on a total message unit basis, and typed records of so-called straddle calls, i. e., those in which, for one reason or another, the answer, the disconnect, or the initial entry relating to a call are present on more than one tape. Within the scope of the invention certain other information may be derived and produced as a typed record, for example, line observing information, verification of numbers of newly connected subscribers, etc.

A tape suitable for initial use in an accounting office of the class referred to may be one produced in accordance with the disclosure of the application of Cahill-Carpenter-Dimond Serial No. 57,388, filed October 29, 1948, now Patent No. 2,599,358, or the equivalent thereof.

Such a tape may contain entries resulting from the use of many transmission circuits (which may be known as district junctors or by other designations) of the central office. In such tapes the initial entries contain, among other information, the calling subscriber line number, answer entries, disconnect entries, and day and hour entries. Because a single recorder may be used in common to and ordinarily is used in common to a number of transmission circuits, the initial, the answer, and disconnect entries of a particular call are interspersed with entries relating to other calls.

However, each such entry is identified by the transmission circuit used for the purpose of this call and the number of this circuit forms a part of the entry record.

These trunk or transmission circuit number entries serve an essential purpose in the first processing of the single office tape which is sometimes referred to as assembling. The nature of the assembling process and a disclosure of equipment for accomplishing it is found in the Carpenter-Gooderham Patent 2,558,476, dated June 26, 1951, which resulted from application Serial No. 724,992, filed January 29, 1947.

The assembling process results in a series of tapes which, when spliced together in proper order, comprises the input tape for the apparatus disclosed in this present application.

The invention disclosed and claimed in this present application consists of certain features of an accounting office now embodied in equipment known as a computer and which is sometimes more specifically designated as a computer-sorter because it may accomplish certain sorting functions.

A more elaborate disclosure of the computer is found in the application of A. E. Joel, Jr., Serial No. 101,087, filed concurrently herewith.

General appearance

The general appearance of one embodiment of the invention is given in the perspective view in Fig. 1. There are two cabinets 100 and 101 in which the relays and other small apparatus are mounted. The key and lamp panels are indicated at 102 and contain the set-up switches, the various lamps and the keys used in investigating the condition of the computer at any time, particularly after an alarm has been brought in. Two main alarm lamps 103 and 104 are indicated as being mounted near the top of the relay cabinets and are in such a position that they can be seen from any part of the large room in which this piece of apparatus is mounted along with similar appearing apparatus for the assembler, the sorter, the summarizer and the printer. Shown in this view, there are six cabinets of which the first one 105 houses the reader. A reel 106 below the reader holds a long length of tape such as 107 which feeds into the reader above and after being processed is returned to and wound on another reel. Each of the other cabinets such as the right-hand end one 108 houses a pair of perforators. In each of these cabinets there is mounted a bin such as 109 containing a long length of unperforated tape which after being processed by the perforator is fed into another bin 110. The computer may contain as many as nineteen perforators as will be explained hereinafter and each customer charge as it is computed is sorted by being selectively perforated on one or another of the various output tapes.

General operation

Fig. 2 is what might be termed a thumb-nail sketch to explain the organization of the device forming the subject-matter of the present invention. It consists of a reader 200 for reading the perforations on an incoming tape representing items of information comprising the gathered and assembled data for customer or subscriber charges. As the various codes are sensed by the reader they are then distributed by means of the register connectors 201 to registers 202. The registers here represent a temporary holding means for the information, part of which is used for calculating purposes or for internal rearrangement and is re-registered and part of which is retained in its original form before being routed to output tapes. At any rate a selecting means, here shown as the line pattern connector 203 is employed to glean from the registers selected bits and items of information and then through another distributing arrangement, the perforator connector 204 to route the computed charge data to the various perforators 205 whereby a plurality of output tapes are formed.

There are two communication channels, or trunks, one to transmit the incoming data from the reader to the registers and the other to transmit the outgoing data from the registers to the tape perforators. The registers form the heart of the device, for it is within this arrangement that the information is processed and held ready for the output circuit to make its selection and its records.

This Fig. 2 will then be regarded as a backbone or skeleton for the more elaborate schematic shown in Figs. 4 to 13, here arranged as shown in Fig. 3.

In this general schematic of the system, the input or reading means is shown in Fig. 4. This consists of a reader 400, a device essentially for the sensing of the twenty-eight code perforations in the automatic accounting system tape, incoming to this unit of the system and which had been produced as an output tape by the assembler. The reader consists of an assemblage of twenty-eight pins which seek to pierce the holes perforated in corresponding positions of the tape, those which succeed, signaling the achievement by connecting ground to a corresponding conductor and those whose path is blocked by unperforated tape holding their corresponding conductors open.

The twenty-eight conductors connected to the twenty-eight reader pins pass through the contacts of the reader connector 401 by means of which they may be connected as determined by the control circuits to the reading relays. In the case of the first three of these conductors representing the code for the first or A digit, an additional break is placed in the path of these conductors consisting of the make contacts of the ST3 start relay 402 in the off-normal and start circuit 403 so that the A digit codes cannot operate the A digit reading relays until the device has been properly started and is in satisfactory operation.

The coded grounds are thus extended to and operate the reading relays during the reading interval and so far as the registers into which the codes are read merely act to relay the ground signals from the reader. However, the reader closes but a single path whereas each reading relay controls a plurality of contact sets whereby the validity of a code may be tested and various other control circuits may be closed whereby the item of information contained in a code being read by the reader not only may be forwarded to a register but a part of the code may be used for control and other operations.

As clearly indicated in Fig. 4, the twenty-eight places of the code are allotted three for the first or A digit and five each of the following five B, C, D, E and F digits. The A digit reading relays 404 consist of the A0, A1 and A2 relays and are used to index the line read and to thus classify the information contained in the other five digits.

By way of example, a zero in the A digit, signaled by the operation of the A0 relay, may be a splice code or a supplementary line of an initial entry, a 1 in the A digit, is a timing entry such as the disconnect or the answer time, the 2 in the A digit may be the first line of an initial entry, one of the tape identity codes or some special code and lastly a 3, signaled by the simultaneous operation of all three A0, A1 and A2 relays may be a special code such as a timed release at the disconnect time.

Each of the remaining five digit groups of reading relays such as the B digit group 405 have five relays designated 0, 1, 2, 4 and 7 and are known as a two-out-of-five group, since the code to express any one of the ten digits consists of the energization of two out of the five available relays in such a combination that the sum of their designations equals the digit expressed. An exception to this general rule is that the operation of the 4 and the 7 relays expresses the digit 0.

The splice code 081010 is then expressed by the operation of the A0 relay in the A digit group 404, the B1 and B7 relays in the B digit group 405, the C0 and C1 relays in the C digit group 406, the D4 and D7 relays in the D digit group 407, the E0 and E1 relays in the E digit group 408 and the F4 and F7 relays in the F digit group 409. Other codes are expressed in like manner.

The tape identity codes are those which have the same first three digits 289 and count from 2891XX to 2899XX so that in this case the 289 is used for certain control purposes, the 1 to 9 in the D digit for counting purposes and generally only the last two, the E and F digits for actual information purposes.

When it comes to the actual information codes, such as the timing entries and the initial entries, then only the A digit is used for indexing purposes and the rest are all used for true information purposes.

Other entries interspersed with the three informational codes above, such as the hour entries contain actual information in only the last two or three digits and identification of the entry in the others or at least in the first four or three thereof.

The computer is prepared for operation by adjusting a plurality of set-up switches to express information concerning a tape to be processed. Such switches are here represented by the E and F set-up switches 1100 and 1101, respectively, and by means of such switches the following information may be established:

1. Sort of MU calls to be effected
2. Marker group—tens
3. Marker group—units
4. First recorder—tens
5. First recorder—units
6. Last recorder—tens
7. Last recorder—units
8. Day of round—first
9. Day of round—last
10. Month—tens
11. Month—units
12. Round All of this information with the exception of the first will be found in the tape identity codes and these codes must check by automatic circuit operation against the setting of the switches before operation of the device may proceed.

After the set-up switches are adjusted and the incoming tape has been introduced in the reader the tape end key is operated temporarily and then the start key is operated. It is necessary to operate the tape end key first because the ends of all output tapes must be prepared before the computer can go into operation and, therefore, the circuit is so arranged that until the tape end key has been operated and then restored the operation of the start key will be ineffective. Once the tape end key has been operated the operation becomes automatic and twenty-seven or some multiple thereof of the splice code will be perforated in all the output tapes. In accordance with certain arrangements which will be fully explained hereinafter, nine codes are spread over the output tapes and this is repeated three times. If the tape end key is restored before this operation is complete, then the operation will halt after each output tape has had twenty-seven splice codes perforated therein, otherwise the operation will be automatically repeated. Thereafter, the start key will be effective.

In the lower part of Fig. 11 the rectangle 1102 represents the entry spread progress circuit and consists of a sequence arrangement known as a walking circuit, whereby the ten MU perforators are operated in turn followed in order by the perforators for the straddle tape, the line observing tape, the MU detail tape, and the six detail tapes or any selection of these which may be determined by the nature of the incoming tape and recorded on the set-up switches. These various perforators, or rather means to sequentially render them operative to perforate a given code are here represented by the relays such as the MU0 relay 1103 at the left to the DET6 relay 1104 at the right.

The control of this entry spread progress circuit over the perforators is here shown schematically by the conductors such as the 0 conductor 1105 controlled by the MU0 relay 1103 and the 6 conductor 1106 controlled by the DET6 relay 1104 which may be effectively traced over the path 1107 through the day sort control 1300 and the perforator register 1301 to the perforator connector relays such as the P-0 relay 1302 and the P-18 relay 1303. Thus, the perforators such as the PERF.0 designated 1304 and the PERF.18 designated 1305 may be sequentially connected to the trunk for controlling the perforations to be made.

This trunk consisting of twenty-eight conductors extends from the line pattern connector 1108, through Fig. 12 and Fig. 13 to the twenty-eight relays A0 to F7 here shown as the perforator check circuit 1306.

The 081010 splice pattern code is formed in the line pattern connector 1108 employed for the end of tape preparation. In this rectangle, there is indicated the 081 relay 1109 which will extend grounds to the conductors of the perforator code trunk described so that each perforator as it is sequentially connected to this trunk will, as before stated, perforate a series of nine splice pattern codes, to be repeated three times.

It may now be assumed that the tape end key is restored and the start key is operated so that the device will go into operation. The splice code on the end of the incoming tape will be passed through the reader until the tape identity codes are encountered. These are nine codes 2891XX to 2899XX in order. The first of these must have the tape index 02, indicating that the incoming tape is one prepared in a second sort operation by the assembler. In the computer then the first code encountered after the splice pattern is 289102 and no other code will advance the operation of this device to further operations. It may also be noted at this point that no other accounting system device will accept this tape except the printer when set for verbatim printing.

The tape identity codes are then read by the reader, each in turn, and the information they carry is checked against the information expressed by the setting of the switches such as 1100 and 1101, also here generally indicated by the rectangle 500. Each of the codes 2891 to 2899, inclusive, will be expressed by the A, B, C and D digit reading relays and passed to the tape identity progress circuit 501 wherein a series of relays such as L1 relay 502 and L9 relay 503 will respond as each line is checked. As each line proves satisfactory a signal is given over the RS1 lead 504 to operate the RS1 reader step relay 700 to properly advance the tape in the reader to the next code. On the last line the reader step relay is not operated immediately but held until this information can be spread on the output tapes. When the full nine lines of the tape identity codes have been checked, then the IC tape identification check relay is operated, and this will start the next operation by which the tape identification is spread on the prepared ends of each output tape, the complete nine lines on one tape and corresponding lines then repeated on the next tape under control of the entry spread progress circuit 1102. The TIE, tape identification ended relay 505 operates after all the tape identification codes have been perforated in all tapes.

The specific information for each line of tape identification is derived from the setting of the set-up switches such as 1100 and 1101 under control of the line pattern connector 1103 for the end of tape, such information being transmitted over the output trunk to the perforators such as 1304 and 1305.

The output tape ends having been prepared and a reader step relay having been operated, the first code of the time group having an item of general information is read. This is the recorder number in the form 280XTU where the D digit (X) is used to indicate that the recorder is a regular or an emergency unit and the E and F digits provide the tens and units digits of any recorder number from 00 to 19.

The A digit reading relays are shown here as exercising a control over the control circuits 506 and these in turn over the paths 507 and 600 as controlling the recorder register connector 701. If no recorder number has been registered then the RCRA relay 702 will be operated to register the D, E and F digits being read by the reader in appropriate parts of the recorder register 703. It may be noted at this time that where the recorder number code is encountered again at the beginning of another section of the incoming tape, the RCCA comparing relay 704 will be operated so that the recorder number may be compared with the number previously registered.

The next code is the hour code, 2811TU, and now the control circuits 506, over the path 601 cause the operation of the hour register connector 802 to register in the earlier hour register 900 this hour entry (generally 03). If this is as now assumed the first hour entry, then the H1A-B relay 604 is operated to register the hour as read. It may be noted that each subsequent hour entry, 2810TU, is through the H0A-B relay 603 whereby the value of the hour is reduced by 1 as it is transmitted to the earlier hour register 900.

The hour having been registered in the earlier hour register it is now transferred through the hour transfer check connector 901 to the current or disconnect hour register 902. This being the first hour entry such transfer takes place immediately. Where, under other circumstances, there is an existing registration in the disconnect hour register 902, then a check is made to see that the hour registered in the earlier hour register is one less in value than such existing registration and when this is proved the said existing registration is released and that in the earlier hour register 900 is transferred to the disconnect hour register 902.

The third and final item of general information is the calendar day code, in the form 2821TU, where T and U stand for the tens and units digits of the actual calendar day. Again the control circuits 506 over the path 601 operate the day register connector 605, and the registration is made in the day register 903. This is made in the decimal code, there being four tens relays representing the 0, 1, 2 and 3 for the tens digits of the calendar day and a full complement of ten units digits. When this registration is complete the computer is ready to proceed to its main duties.

It may be noted that the central office tape having been passed through the assembler twice, once on a units digit sort and once on a tens digit sort there may be as many as one hundred sections in the 289102 tape coming to the computer. These time group entries will follow the splice code in every case and, therefore, the processing of each section of a tape is preceded by the reading of these three, recorder, hour and day entries. During the processing of a tape section, there may be regular hour entries and these will adjust not only the hour registration but the day registration, for as the hour changes from 00 to 23, at midnight, the date also changes. This usually results in the diminution of the date by 1 but may entail a complete change, such as from 1 to 31, 30, 29 or 28.

The recorder hour and day entries are not copied on any one of the output tapes but the registrations are held available to the line pattern connector whereby bits of information are gleaned from different sources to form the required output lines.

The computer acts as a sorting device to sort the various charges into different categories, such as message unit charges, toll charges, detailed records, line observing records and irregular records as well as discards. In addition, in single office marker groups the message unit calls may be further sorted by one digit of their directory numbers. Tapes from multioffice marker groups must be sorted by offices. Where the incoming tape from the assembler contains records for more than one day the detail records may be sorted in days. The controls for these different sorting operations are primarily responsive to the information in the initial entries and are further vested in the set-up switches and certain auxiliary circuits as will more fully appear hereinafter.

A regular message unit (MU) call record consists of three entries, the disconnect time, the answer time and the initial entry and it is not known that this is a message unit record until the initial entry is reached. However, the disconnect time and the answer time are registered and transmitted to the calculator and generally the elapsed time is calculated before the initial entry is registered. All three entries, however, must bear the same call identity index. This is registered upon the registration of the disconnect time and the index with each of the next two entries is compared with it.

Let us take as an example a call made by a subscriber at station SUmmit 6–5444, within the period covered by a record about to be processed. The initial entry for such a call, which happened to be made over a facility identified by the call identity index 27 would be 213027
035444 in which the message billing index (digit C of the first line) is assumed to be 3 and the office index (digit B of the second or first supplementary line) is 3 and which combined with the marker group would identify the office SUmmit 6.

Let it be assumed that the call was answered at 11.535 and the disconnect took place at 11.582. The answer timing entry would then be

153527 and the disconnect timing entry would be

158227

Now this call would have been assembled by the assembler and recorded in such manner that it would now be read by the computer in the form:

158227
153527
213027
035444

Therefore, the reader may now be assumed to read the first of these lines:

158227

The control circuits 506, over the path 600, cause the operation of the DTRA–B relay 705 in the timing entry register connector 706 so that the B, C and D digits thereof may be transmitted through the B, C, and D sections of the disconnect time translator designated 1000, 1001 and 1002, respectively, whereupon the three digits 5, 8 and 2 are translated from the two-out-of-five code to the biquinary code, which is peculiarly well adapted for calculation. After translation these three digits are transmitted to the adder 1003 where they are registered in the TD (tens, disconnect), UD (units, disconnect) and PD (tenths, disconnect) adder relays.

At the same time the disconnect time is transmitted to the disconnect time register where a record of this data may be retained until it is certain that it is no longer needed. The arrangement of the disconnect time register 606 and the disconnect time translators 1000, 1001 and 1002 is such that while both are operated by the reader, the latter are then held operated by the register 606. In this sense, the register is needed until the call has been disposed of. However, the register 606 has a regular output which may not always be used. In a regular MU call it is not needed but in a detail call or an irregular call it will be needed. It is, therefore, registered in the disconnect time register until the processing of the data for this call is completed.

The E and F digits 2 and 7, respectively, of this first line of the entry constitute the call identity index and must be registered to identify later entries of this same call. Accordingly, when this line is read by the reader the control circuits 506, over the path 607, cause the operation of the DJR2 relay 608 whereby the E and F readings of the code are transmitted over path 609 to the call identity index register and decimal translator 800. The call identity index is, therefore, retained for reference purposes and for comparison with the call identity index readings of the succeeding entries of this call.

When the disconnect time register 606 up-check circuit and the call identity index register 800 up-check circuits are closed showing a proper registration of this entry, the RS1 reader step relay 700 (circuits not indicated) is operated and the reader is advanced to read the next entry, the answer time.

The answer time line

153527 is now read by the reader. The control circuits 506, over path 600 now cause the operation of the ATRA–B relay 707 whereby the B, C and D digits 535 of this line are transmitted to the B, C and D answer time translators 1004, 1005 and 1006, respectively, for transmission on a biquinary basis to the TA, UA and PA relays of the adder 1003.

As soon as the adder up-check circuits report a satisfactory registration the elapsed time will be calculated. The method of calculating is to express the addend in its natural form, the augend as its nine's complement, to add in a "one" in the lowest denominational order and to ignore, or throw away the "carry one" out of the highest denominational order. Thus, where the disconnect time is 58.2 and the answer time is 53.5 the elapsed time is 4.7 and this is arrived at by adding

```
 582
 464
   1
————
1047
``` wherein the left-hand 1 is discarded so that the result becomes 047.

There are, however, other considerations in calculating the elapsed time and hence the value calculated in the tens order is carried through the hour tens adder 1008 so that 6 (for 60 minutes) or some multiple thereof may be added if there have been one or more hour entries between the disconnect entry and the answer time entry. In the present case we assume there have been no such entries and hence the value 0 is transmitted through the hour tens adder 1008 without change, and the three digits 047 are brought into the elapsed time round-off translator 1307, each to its corresponding denominational order. In actual practice, a small time allowance to cover traffic delay in establishing a connection after the called party has answered and delay in recording the disconnect signal is made and then the call is rounded off to the next higher minute. The details of these operations carried out in the elapsed time round-off translator 1307 are described in detail hereinafter. The output of these translators is chargeable time and as such will be used as described hereinafter. The carry-out from the tens translator goes into the control circuits (not shown) for the purposes to be described. The carry-out 0 will indicate a negative result while the carry-out 1 will indicate a normal positive result and will constitute a signal to advance the operations, As in the case of the disconnect time, the answer time also is registered in the answer time register 708. When the answer time up-check circuit is closed the AUC relay 709 is operated providing the call identity index also checks and the RSI reader step relay is also operated to advance the reader to the first line of the initial entry.

Upon the operation of the ATRA-B answer time register connector relay 707 a ground is extended directly to the JCT-JCU call index check connector relay 610 whereby the E and F digits of the answer time line (constituting the call identity index) are extended for comparison with the call identity index already registered in the call identity index register and decimal translator 800. If the comparison of these numbers proves them to be identical then a check circuit combined with the up-check circuit for the answer time register 708 will cause the operation of the reader step control to advance the tape in the reader so that the first line of the initial entry may be read.

The first line of the initial entry is now read by the reader. The A digit is 2 and since this has been assumed to be an MU record the B digit is 1. The B digit in the first line of each initial entry indicates the general character, message unit, detail or line observing and will cause the operation of a corresponding relay in the input class register 509 which is of prime importance in the later operation of the output class register 1111. In this case the control circuits 506 over the path 607 operate the CLRA-B relay 611. The value in the C digit is transmitted to the billing index register 801 and the call index check connector 612 is operated as before to check the call identity index in the register 800.

The reader line count circuit 508 may actually be considered part of the control circuits 506 and is shown as being operated from the same source and as having a control over these control circuits. It functions to keep a count of the lines of code read for each group of lines constituting the charge data for each call. It is a steering means and is shown as providing a path for the connector relays for the supplementary lines of the initial entry.

Thus, on the first supplementary line of the initial entry which follows the proper entry of the first line and the successful comparison of the call identity index, the reader line count circuit 508 will cause the operation of the NRA-B-C calling number connector relay 613. Thereupon, the B, C, D, E and F digits of this supplementary line will be transferred to and registered in the calling number register and decimal translator 802, so that the output line or lines are now ready to be perforated if everything has been regular.

The B, C and F digits have output paths leading through the sort class connector 1110 to control the sorting of the call in accordance with predetermined conditions, particularly as recorded on the set-up switches.

Meanwhile, during the reading of the lines of the initial entry the computation of the elapsed time has taken place, so that during the registration of the last supplementary line the output is prepared. Assuming everything to be regular and the chargeable time to indicate nine or less message units, then the charge data becomes a single line transmitted to the particular output perforator selected by the sort class connector 1110 and the value of the digit registered in the calling number register 802. Under control of the output class register the DN directory number pattern forming relay 1200 will be operated to control the pattern of the output.

The number of message units is calculated from the computed chargeable time. The output of the elapsed time round-off translator 1307 is transmitted through the message units formula circuit 1201, under control of its connector 1202 and the calculated message units are registered in the message units register 1203. It may be noted that the chargeable time is in some cases also transmitted through the chargeable time translator 1204 and registered in the chargeable time register 1205 where it is available where details are wanted. In the case under assumption it is not needed and will not be used. However, the number of message units calculated and which have been assumed to be capable of being expressed in one digit are available over the F path coming out of the message units register 1203 and are transmitted by the BK1-A relay 1112 in the output class register 1111 to the B group of contacts of the DN relay 1200 so that the B digit of the output line will contain the computed charge in message units.

The calling line number is transmitted from the C, D, E and F parts of the calling number register 802 to the C, D, E and F contacts of the DN relay 1200 so that these digits of the output line will contain this calling line number.

The A digit of the output line is formed through the operation of one of the relays in the output class register 1111, such as the BK1-B relay 1113 so that this is recorded as 1.

Had the number of message units calculated been ten or over and, therefore, been capable of expression only in two decimal digits, then the output becomes a two-line entry with the DN pattern relay 1200 operated for the first and the TMU relay 1206 operated for the second line. In this case, the A digit of the first of these lines is recorded as 2 under control of the BK2-B relay 1114, and the B digit is recorded as 0 under control of the same relay (path not shown). The C, D, E and F digits are derived as before from the calling number register 802.

The second line is formed by the TMU relay 1206. The A and B digits both become 0 under control of one of the relays in the output class register such as the BK2-B relay 1114. The computer connector and control circuit 805 may be set to operate through the call type translator 907 to change the record in the B digit through the TMU relay 1206 from a 0 to a 1 or 2.

The C and D digits are invariably zeros in this line under control of the DAB relay 1115.

The E and F digits are supplied by the output of the message units register 1203.

As each output line is perforated the perforator check circuit 1306 reports the progress of the operations to the perforator control circuits 1309 and after a complete set of charge data lines have been perforated on a selected output tape the individual and specific operating units are released and made ready for another call. Items of general information, such as the hour and the day are retained since this information is common to all the calls within a given section of tape. In actual service there is an overlap operation of elements of the device, consisting of the release of the disconnect and answer registers as soon as it is determined that sufficient information has been stored for the perforation of an output tape. Thus, the disconnect and answer registers may be cleared before the computer has completed its task and the disconnect time and the answer time for the next call may be in process of being registered and may even be completely registered before the remainder of the device is released.

It is not necessary to describe in detail the complete operation in other types of calls. All calls or groups of items of information representing the data for each customer charge consists of three items; a disconnect time, an answer time and an initial entry. In each case the two timing entries are entered first so that they may be placed in the adder at the earliest possible moment so that the computation of the elapsed time may be made as the remaining information is being entered. The simplest case has been described in which certain of the apparatus provided has not been used. In the more complex cases such as the toll or detail call the area and called office register 803 and the called number register 804 are called into use to store information contained in the initial entry and from which information is gleaned by the pattern relays of Figs. 12 and 13 for forming the output lines.

One of the important items on all calls in which the details of the charge are reported is the start time line. This is a line coded from six digits of the day, hour and minutes at which the call is started, generally speaking, the answer time. The tens and units digits of the calendar day are taken from the day register 903, passed through the connector 904 to the day register translator 905 from which the tens digit is passed to the start time line register 906 for combination with the minutes tens digit from the answer time tens translator 1004 to form the B digit of the start time line. In a similar manner, the hour tens digit is taken from the disconnect hour register 902, passed through the start time line register connector 908 and combined in the start time line register with the minutes tens digit from translator 1004 to form the C digit of the start time line. The B and C digits thus formed are transmitted to contacts of the TM pattern relay 1308 for use as required. The D digit of the start time line is the units day digit and, therefore, is the F digit coming out of the day register translator 905. The E digit of the start time line is the units hour digit and, therefore, is the units digit taken from the current or disconnect hour register 902, passed through the start time line register connector 908 and registered in the time pattern register 909. The F digit of the start time line is the units digit of the minutes and comes from the units section of the answer time register 708 and is passed through the start time line register connector 908 and registered in the time pattern register 909.

Thus, the main elements of the computer and their cooperative relationship to each other have been briefly noted and may be summarized as follows: The computer consists of a reader for reading off items of information from an incoming tape, a plurality of registers and translators for storing the information, a calculator for computing charges, a pattern circuit for supervising the lines of a computed charge and a plurality of perforators, selectively taken into service for recording the computed charges under control of the reader.

Supplementary to these regularly employed elements is the straddle circuit which has supervisory functions and acts to keep a constant watch on the operations of the computer so that if there is any deviation from regularity the control is seized and the call is then disposed of under direct control of this circuit. Certain calls such as don't answer and busy calls are discarded and others are recorded on a straddle tape where full details may be spread before a clerk for proper disposition. The important element in this circuit is the entry progress register which has a connection from each of the registers to report the proper operation thereof. Herein is shown, by way of example, the path 614 leading from the disconnect time register 606 to the entry progress register 510 to report the proper entry of the disconnect time. Should the disconnect time fail of registration and the other elements of the call be properly registered then the entry progress register would report a call with only one timing entry and if this were at a leading tape end the straddle input register 511 would be operated, in turn operating the straddle output register so that details of the call would be reported on the straddle tape. There are numerous circumstances by which the straddle circuit takes charge of the output circuit, dealing with numerous causes of irregular calls, all of which are more fully described in the said Joel application.

*Characteristic feature of the invention*

A feature of this invention which merits special attention is a control means by which a customer charge which has been derived by the device from information entered thereinto by the reader is directed into a particular one of a plurality of out-going channels. The computer circuits of which the present application features a specific part are fully disclosed in the said Joel application. This computer functions not only to derive customer charges but also to sort the derived charges into several categories and also to sort derived charges within a given category into a plurality of subclasses. Thus, the customer charges must be first sorted into what are here termed message unit calls, toll calls, irregular calls, etc. and thereafter be further sorted in accordance with other considerations. By way of example, if the incoming tape contains data for calls from a plurality of offices then the message unit calls are further sorted by office but if such incoming tape is for but a single office, then the message unit calls are sorted on a decimal basis. In accordance with one digit of the number which identifies the customer, a sorting charge must be undertaken in any event and which if not accomplished here within the computer will be undertaken by the sorter, the next device employed in the accounting center.

The means for controlling this sorting is automatically determined by the combination of (a) a multidigit item of information recorded on the "set-up" switches and confirmed by a like item of information included in the tape identity information and thus common to all the specific data on the incoming tape and (b) a single digit item of information contained in the specific data for each customer charge.

Each incoming tape containing data to be processed into customer charges is accompanied by certain items of general information and this information is expressed through the setting of a number of so-called set-up switches. The set-up switches shown in Fig. 15 and designated by their movable contacts are as follows: The switch 1500 is one on which the tens digit of the marker group may be expressed. The three switches 1501, 1502 and 1503 operate from the same manual control and are used to express the units digit of the marker group. The last switch 1504 is one known as the sort switch on which the type of sorting which it is wished to carry out may be expressed.

Let us assume, by way of example, that the marker group is 00 so that the tens switch 1500 will be set on the 0 contact and the units switches 1501, 1502 and 1503 will also be set on the 0 contact.

It is known that the marker group 00 is one which contains but a single office and, therefore, sorting of the message unit calls must be either by the thousands or by the units digit. Therefore, the sort switch 1504 will be set on either its No. 1 or No. 2 contact. Let us assume in this case that it is desired to sort the message unit calls by the units digit of the calling telephone number and, therefore, the switch 1504 will be set on its No. 1 contact.

By itself, the registration of this information on the set-up switches is one which must be confirmed by items in the tape identity information of the incoming tape and, therefore, unless the incoming tape contains the notation that the marker group is 00, the processing of the tape will get no further than the reading of the marker group number after which an alarm will be brought in so that an attendant will have to rectify the error.

Let us suppose that these set-up switches have been adjusted as just explained and that their setting has been properly confirmed by the tape identity circuits so that the actual processing of the calls may be taken up. From the off-normal and start circuit indicated in the rectangle 1517 the master off-normal relay 1505 will place a ground on conductor leading to the switch arms 1500, 1501 and 1503. The ground will be extended through the marker group tens switch 1500 to operate the three relays 1506, 1507 and 1508. The ground extended through the marker group units switch 1501 will then be extended through the 0 armature of the MTOC relay 1506 to the sort switch 1504 where it will further be extended in accordance with our assumption over the conductor 1509 to operate the US1 relay 2100. The ground extended through the marker group units switch 1503 will be likewise extended through the 0 armature of the MTOA relay 1508 to cause the operation of BIT00 relay 1600. Therefore, the setting of the marker group tens and units switches to represent the marker group 00 results in the operation of the units sort relay 2100 and the billing index translator relay 1600.

It may be noted that since traffic arrangements are a concern of the commercial personnel of a company that such arrangements may change from time to time and hence each of the front contacts of the relays such as the MTOC relay 1506 is represented as terminating in a cross-connecting point. Likewise, the terminal of each of the BIT relays of Fig. 16 is represented in the same manner. Therefore, the connection between the front contact of the 0 armature of the MTOA relay 1508 and the terminal of the BIT00 relay 1600 is in the nature of a cross-connection, that is, a connection which has been made on a permanent basis but which is capable of being changed at short notice a simple soldering operation.

During the operations of processing the information for derived customer charges, the calling number register 1800 will be operated for each set of data since the number of the calling subscriber is necessarily a part of this data. This number generally consists of five digits known as the office digit, the thousands digit, the hundred digit, the tens digit and the units digit. In this showing, only the office digit, the thousands digit and the units digit are indicated. Let us say that through the operation of the US1 relay 2100, the message unit calls will be sorted in accordance with the units digit of the calling line numbers. Therefore, if during the processing of a particular call the units digit proves to be 9 then a circuit will be set up from a ground through devious circuits here indicated by dotted lines over the 9 lead to the armatures of the US1 relay 2100, thence over the armature 9 and front contact thereof to operate the P9 perforator connector relays here represented by the P9D relay 2101 and the P9A–B–C relay 2102 in series therewith. This will connect the No. 9 Mu perforator here numbered 2103 to the trunk over which the outgoing information is transmitted. This trunk consists of a plurality of conductors over which various information may be transmitted such, for instance, as the number of message units which have been calculated or derived and which have been registered in the message unit register 1700. When the perforator connector is operated, then the record of the number of message units to be charged which is registered in this message units register 1700 is transmitted in two digits, a tens and units digit through the line pattern connector 1701, over the trunk 1702, through a check circuit here represented by the rectangle 2104 and thence into the MU9 perforator 2103.

The number of message units registered in the register 1700 is derived first of all through the operation of the BIT00 relay 1600 from a single digit billing index in the specific information of the data for this particular customer charge. Some one of the 1 to 8 leads coming from the billing index register 1601 will be grounded. Let us assume that the billing index in this case is 2. In that case the 2 armature of the BIT00 relay 1600 will be employed to extend a ground to the winding of the charge plan CP002 relay 1602.

Let it now be further assumed that in the operation of the computer the elapsed time has been calculated as 54 minutes. Therefore, in the elapsed time tens round-off translator 1603 the No. 5 lead will be grounded and this will be extended over the No. 5 armature of the CP002 relay 1602, over the No. 5 outgoing lead therefrom to operate the T5 relay 1703. In the elapsed time units round-off translator 1704 the No. 4 and No. 4' conductors will be grounded. In this particular case, only the No. 4' conductor will be effective and that will cause ground to be extended through the B54 armature of the T5A–B relay 1703 to the conductor 1705. This is known as the 99 conductor and indicates either that the elapsed time or the number of message units to be derived therefrom in accordance with the charging plan is over the capacity of the computer so that the information will have to be diverted away from the message unit tape to the irregular call or straddle tape. The ground on conductor 1705 is, therefore, extended over the back contact and armature of the COTA relay 2000, the back contact and armature of the DSDA relay 2001, the armature and back contact of the CLB relay 2002 to operate the OC over capacity relay 2003. The further operation of this circuit is of no particular concern at the present time.

Let us assume, on the other hand, that the elapsed time figured to be 4 minutes, then the elapsed time tens round-off translator 1603 would have caused the grounding of the 0 lead which will now be extended through the 0 armature of the CP002 relay 1602 to cause the operation of the TOA-B relay 1706. Then upon the grounding of the No. 4 and No. 4' leads in the elapsed time units round-off translator 1704 a circuit will be established over the No. 4' lead, the B04 armature of the T0 relay 1706, the MUT0 conductor to operate the MUT0 relay 1707. In the same manner, a ground will be extended over the No. 4 conductor from the elapsed time units translator 1704, over the A04 armature of the T0 relay 1706 to the MUU7 conductor to cause the operation of the MUU7 relay 1708 thereby registering in the message unit register 1700 the fact that a charge of 07 message units has been derived from the elapsed time of 4 minutes.

It may be noted that a correct number of various charging plans may be established through the use of the charge plan relays such as the CP002 relay 1602 and the message unit formulator relays such as the T0 relay 1706 and the T5 relay 1703.

In the upper part of Fig. 19 a series of relays such as the MU0 relay 1900 to the MU9 relay 1901 is shown. These relays are known as the entry spread progress relays and are placed in a circuit whereby they are successively operated when a spreading operation is under way so that the various perforators may be successively enabled.

For certain checking purposes and as a matter of surety these relays are sequentially operated on an odd and even basis as controlled by the P1 relay 1801, the P2 relay 1802 and the P3 relay 1804. When these relays have been operated, they are under the control of a bank of TC relays such as the TC2 relay 1902. If the TC2 relay has been operated, then the MU0, MU1 and MU2 relays will be effective to enable their corresponding perforators but the MU3 and higher numbered relays of this series will, instead of enabling their corresponding perforator connector relays, cause the operation of the skip relay 1805. This arrangement is made so that during the operation of the computer when an item of information is derived which it is necessary to perforate on all outgoing tapes, it may be perforated on those which are being produced, whereas those tapes which are not being employed may be skipped. This may best be illustrated by another example.

Let us assume that the marker group switches have been set to indicate the marker group 23. In this case, the marker group tens switch 1500 will extend ground to MT2C relay 1510, the MT2B relay 1511 and the MT2A relay 1512. The MT2C relay 1510 will have a ground extended through its No. 3 armature by the switch arm 1501 set on its No. 3 contact and will then be extended to the winding of the OS1 relay 2105 and effectively to the winding of the OS2 relay 2106. This is known as the office sort relay and will place the selection of a perforator connector relay under the control of the office digit of the calling number register 1800. The sort switch 1504 in this case is set on its 0 contact or on its office sort position and is ineffective in the following operations. Under conditions fully disclosed in the complete description in the Joel application the SPA relay 1513 will be operated during the spreading operations so that a ground extended by the OS2 relay 2106, over the armature and contact of the SPA relay 1513, the marker group units switch 1502, the No. 3 armature of the MT2B relay 1511 to cause the operation of the TC2 relay 1902. This establishes the fact that there are three offices in the marker group No. 23 and, therefore, during the spreading operation controlled by the circuits of Fig. 18 the MU0, the MU1 and the MU2 perforators will be enabled but when the MU3 spread progress relay 1903 and higher numbered relays of this chain are operated, then the skip relay 1805 is operated and the chain is advanced in the same manner as though the perforator had been selected and employed.

Under these conditions, the specific items of information will ground the 0, 1 or 2 lead in the office code part of the calling number register 1800 and the grounding of these leads will, through the corresponding armatures of the OS1 relay 2105, select the proper perforator connector relays so as to cause the perforation of the derived information on the proper outgoing tape.

As another example, we may illustrate the formulation of another charge in this case by noting that a ground will be extended through the marker group units switch 1503 through the No. 3 contact of the MT2A relay 1512 to cause the operation of the BIT23 relay 1604. If in this case the billing index is 1, then the billing index register 1601 will extend a ground through the armature 1 of the BIT23 relay 1604 to cause the operation of the charge plan relay 1605. Let us assume in this case that the elapsed time figures to be 95 minutes. In this case, the elapsed time tens round-off translator 1603 and its No. 9 lead would, therefore, extend a ground over the No. 9 lead outgoing from the contacts of the CP relay 1605 to cause the operation of the T9 relay 2004. By the same token the elapsed time units round-off translator 1703 will ground the No. 5 and No. 5' leads outgoing therefrom and through the No. 5' lead will extend a ground over the B95 armature of the T9 relay 2004 to the MUT3 lead to cause the operation of the MUT3 relay 1709 in the message unit register 1700. The No. 5 conductor from the elapsed time units round-off translator will extend a ground through the A95 armature of the T9 relay 2004 to the MUU3 conductor to cause the operation of the MUU3 relay 1710 of the message unit register. Therefore, it is established that a charge of 33 message units have been registered for a call extending over 95 minutes, in this particular marker group 23.

As a last example, let it be assumed that the marker group has been set up as 99 so that the MT9C relay 1514, the MT9B relay 1515 and the MT9A relay 1516 are operated. Through the marker group units switch 1501 a ground is extended over the No. 9 armature of the MT9C relay 1514 to cause the operation of the OS1 relay 2105. We may assume in this case that the marker group 99 is one having in it a full complement of ten offices. Therefore, the ground extended by the OS2 relay 2106 through the armature of the SPA relay 1513 will be further extended through the No. 9 armature of the MT9A relay 1515 to cause the operation of the TC9 relay 1904. It will be noted by the configuration of the contacts of this relay that all of the ten perforators will be properly enabled and that none of them will be skipped.

Ground will further be extended over the marker group units switch 1503 set on its No. 9 contact through the No. 9 armature of the MT9A relay 1516 to cause the operation of the BIT99 relay 1606. In two instances, that is, where the billing index is 1 and where the billing index is 2 a ground will be extended from the billing index register 1601, over the corresponding armatures of the BIT99 relay 1606 and thence to the SMU single message unit relay 1607 which without further ado grounds the MUTO and the MUU1 leads to the message unit register 1700 to register therein a single message unit.

Thus, it will be seen that through a two-digit number expressing an item of general information, that is, the information that the tape under process has come from a particular marker group and a single digit item of information specific to the data under process that certain controls of the operation of the computer circuits can be exercised, two instances of the exercise of such control have been shown:

1. That in which the selection of the proper outgoing channel is made, that is, the selection of the particular perforator is accomplished; and
2. That in which the selection of a particular charge plan relay is accomplished.

Since the billing index for message units may be any one of eight digits, that is, 1 to 8, inclusive, any one of eight different billing plans may be assigned to each marker group. While two of the contacts of the billing index translator relay 1600 are shown as going to different charge plan relays, the arrangement is not invariably of this type since it is possible that a number or all of the contacts of one of these relays may be extended to the same charge plan much in the manner as indicated over the first two contacts of the BIT99 relay 1606.

What is claimed is:

1. In an automatic accounting system wherein data comprising the record of customer uses of given facilities over variable time periods is recorded in the form of coded items of specific information and coded items of general information on a tape, accounting devices for processing said information to establish customer charges in billable form by sorting, translating, computing or otherwise rearranging said coded items of information from an incoming tape onto a plurality of outgoing tapes, a control factor responsive circuit, means for deriving a control factor consisting of means responsive to a specific item of information for selectively connecting said circuit to one of a plurality of common circuits and means responsive to general items of information correctable to each of said common circuits by a cross-connecting device and operably connected selectively according to one of said general items of information whereby any given control factor may be established through the combination of a given item of general information and a given item of specific information.

2. In an automatic accounting system wherein data comprising the record of customer uses of given facilities over variable time periods is recorded in the form of coded items of specific information and coded items of general information on a tape, accounting devices for processing said information to establish customer charges in billable form by sorting, translating, computing or otherwise rearranging said coded items of information from an incoming tape onto a plurality of outgoing tapes, a control factor responsive circuit, means for deriving a control factor consisting of means for temporarily registering a specific item of information, means for registering a general item of information, a plurality of common circuits leading from said specific-item-of-information register a plurality of connecting relays controlled by said means for registering said items of general information, a cross-connecting arrangement having terminals on the one side connected to control factor circuits and on the other side connected to contacts of said relays whereby said control factor responsive circuit may be selectively connected to any one of said control factor circuits through the combination of a temporarily registered item of specific information and a registered item of general information.

3. In an automatic accounting system wherein data comprising the record of customer uses of given facilities over variable time periods is recorded in the form of coded items of specific information and coded items of general information on a tape, accounting devices for processing said information to establish customer charges in billable form by sorting, translating, computing or otherwise rearranging said coded items of information from an incoming tape onto a plurality of outgoing tapes, a control factor responsive circuit, means for deriving a control factor consisting of means responsive to a specific item of information for selectively connecting said circuit to one of a plurality of common circuits, means responsive to general items of information connectable to each of said common circuits by cross-connecting device and operably connected selectively according to one of said general items of information whereby any given control factor may be established through the combination of a given item of general information and a given item of specific information, means for computing elapsed time from items of specific information, means for registering computed elapsed time and elapsed time relays operated under joint control of said register and said control factor circuit for translating said computed elapsed time into charge units.

4. In an automatic accounting system wherein data comprising the record of customer uses of given facilities over variable time periods is recorded in the form of coded items of specific information and coded items of general information on a tape, accounting devices for processing said information to establish customer charges in billable form by sorting, translating, computing or otherwise rearranging said coded items of information from an incoming tape onto a plurality of outgoing tapes, a control factor responsive circuit, means for deriving a control factor consisting of means responsive to a specific item of information for selectively connecting said circuit to one of a plurality of common circuits, means responsive to general items of information connectable to each of said common circuits by a cross-connecting device and operably connected selectively according to one of said general items of information whereby any given control factor may be established through the combination of a given item of general information and a given item of specific information, means for computing elapsed time from items of specific information, means for registering computed elapsed time, elapsed time relays operated under joint control of said register and said control factor circuit for translating said computed elapsed time into charge units, and an adjustable circuit means connected to contacts of said elapsed time relays for making adjustments from time to time in the rate of charge units in said translation.

5. An improvement in automatic accounting systems of the type wherein coded records are processed by various types of electrical devices to produce customer bills in a number of steps from records automatically produced by customer uses of given facilities over variable time periods, said coded records being in the form of perforated tapes, each said device producing one or more new or output tapes from the records on an old or input tape as modified by that step in the accounting process for which the particular device is designed, each said tape containing items of specific information pertaining to individual customer uses of the given facilities and items of general information common to many uses of the facilities by many different customers at different times, one of said items of general information being a group facility (marker group) identification number, each said device being equipped with a bank of manually controlled switches, including switches for designating the group facility (marker group) identification number which must be recorded as an item of general information on an incoming tape about to be processed, matching circuits for comparing said item of general information as read from said incoming tape with a circuit established by the setting of said manual switches, an alarm and a permissive circuit alternatively responsive to said matching circuits for halting the further operation of said device in case of a mismatch or to forward the operation of said device in case of a satisfactory match, one of said devices being known as a computer functioning to transform groups of specific items of information modified by registered items of general information into customer charges and to sort said computed charges by selectively diverting them to different output tapes, said computer having means for producing a plurality of output tapes, a selecting means for controlling said last means for recording computed customer charges on different ones of said output tapes, said selecting means being responsive to identification codes included in as part of different items of specific information, and circuit means controlled by said group facility (marker group) identification number manual switches for selecting the particular item of specific information in each said group of items of specific information from which said identification code is taken to control said first selecting means.

6. An improvement in automatic accounting systems of the type wherein coded records are processed by various types of electrical devices to produce customer bills in a number of steps from records automatically produced by customer uses of given facilities over variable time periods, said coded records being in the form of perforated tapes, each said device producing one or more new or output tapes from the records on an old or input tape as modified by that step in the accounting process for which the particular device is designed, each said tape containing items of specific information pertaining to individual customer uses of the given facilities and items of general information common to many uses of the facilities by many different customers at different times, one of said items of general information being a group facility (marker group) identification number, each said device being equipped with a bank of manually controlled switches, including switches for designating the group facility (marker group) identification number which must be recorded as an item of general information on an incoming tape about to be processed, matching circuits for comparing said item of general information as read from said incoming tape with a circuit established by the setting of said manual switches, an alarm and a permissive circuit alternatively responsive to said matching circuits for halting the further operation of said device in case of a mismatch or to forward the operation of said device in case of a satisfactory match, one of said devices being known as a computer functioning to transform groups of specific items of information modified by registered items of general information into customer charges and to sort said computed charges by selectively diverting them to different output tapes, said computer having means for producing a plurality of output tapes, a selecting means for controlling said last means for recording computed customer charges on different ones of said output tapes, said selecting means being responsive to identification codes included in as part of different items of specific information, and circuit means controlled by said group facility (marker group) identification number manual switches for selecting the particular item of specific information in each said group of items of specific information from which said identification code is taken to control said first selecting means, said last circuit means including means to determine the number of and to enable for use particular ones of said output tape producing means.

7. An improvement in automatic accounting systems of the type wherein coded records are processed by various types of electrical devices to produce customer bills in a number of steps from records automatically produced by customer uses of given facilities over variable time periods, said coded records being in the form of perforated tapes, each said device producing one or more new or output tapes from the records on an old or input tape as modified by that step in the accounting process for which the particular device is designed, each said tape containing items of specific information pertaining to individual customer uses of the given facilities and items of general information common to many uses of the facilities by many different customers at different times, one of said items of general information being a group facility (marker group) identification number, each said device being equipped with a bank of manually controlled switches, including switches for designating the group facility (marker group) identification number which must be recorded as an item of general information on an incoming tape about to be processed, matching circuits for comparing said item of general information as read from said incoming tape with a circuit established by the setting of said manual switches, an alarm and a permissive circuit alternatively responsive to said matching circuits for halting the further operation of said device in case of a mismatch or to forward the operation of said device in case of a satisfactory match, one of said devices being known as a computer functioning to transform groups of specific items of information modified by registered items of general information into customer charges and to sort said computed charges by selectively diverting them to different output tapes, said computer having means for producing a plurality of output tapes, a selecting means for controlling said last means for recording computed customer charges on different ones of said output tapes, said selecting means being responsive to identification codes included in as part of different items of specific information, said identification codes including an office index, a billing index, and a using customer facility multidigit number, circuit means controlled by said group facility (marker group) identification number manual switches for transmitting said office index or one of said digits of said multidigit number when read from said incoming tape to a responsive means for controlling said selecting means whereby sorting by different items of information may be carried out, a rate controlling means having a plurality of input circuits each differently responsive to different billing indexes and circuit means controlled by said group facility (marker group) identification number manual switches for selectively transmitting said billing indexes into different ones of said rate controlling input circuits.

8. In an automatic accounting system wherein data comprising the record of customer uses of given facilities over variable time periods is recorded in the form of coded items of specific information and coded items of general information on a tape, accounting devices for processing said information to establish customer charges in billable form by sorting, translating, computing or otherwise rearranging said coded items of information from an incoming tape onto a plurality of outgoing tapes, a plurality of set-up switches for conditioning each of said accounting devices to process an incoming tape having given coded items of general information, matching circuits for insuring that said set-up switches exhibit information identical to the information in said items of general information, a control factor responsive circuit, means for deriving a control factor consisting of means responsive to a specific item of information for selectively connecting said circuit to one of a plurality of common circuits and means controlled by one of said set-up switches set to check a given general item of information connectable to each of said common circuits by a cross-connecting device whereby any given control factor may be established through the combination of a given item of general information and a given item of specific information.

AMOS E. JOEL, Jr.
ROBERT O. RIPPERE.

REFERENCES CITED

The following references are of record in the file of this patent:

UNITED STATES PATENTS

| Number | Name | Date |
|---|---|---|
| 2,165,925 | Goodrum | July 11, 1939 |
| 2,268,203 | Carpenter et al. | Dec. 30, 1941 |